United States Patent [19]
Matsuoka et al.

[11] Patent Number: 6,118,555
[45] Date of Patent: *Sep. 12, 2000

[54] IMAGE READING APPARATUS HAVING A LIGHT SOURCE INCLUDING A FLUORESCENT LAMP

[75] Inventors: Kazuhiko Matsuoka; Kenichi Sasaki, both of Yokohama; Miho Sugiyama, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,058

[22] Filed: Mar. 1, 1996

[30] Foreign Application Priority Data

Mar. 2, 1995 [JP] Japan ................................. 7-068830
Feb. 7, 1996 [JP] Japan ................................. 8-046645
Feb. 7, 1996 [JP] Japan ................................. 8-046646

[51] Int. Cl.$^7$ .................................................. H04N 1/04
[52] U.S. Cl. ........................ 358/475; 358/494; 399/220; 355/67
[58] Field of Search ...................... 358/505, 506, 358/509, 474, 475, 487, 494, 500; 399/220, 221; 355/67; 362/260; 313/110, 111, 112; 250/208.1

[56] References Cited

U.S. PATENT DOCUMENTS

| 4,333,030 | 6/1982 | Zitelli ........................................ 313/94 |
| 5,075,539 | 12/1991 | Shiraishi ............................... 250/208.1 |
| 5,126,620 | 6/1992 | Haraga et al. ......................... 313/111 |
| 5,181,118 | 1/1993 | Kimura .................................. 358/461 |
| 5,241,378 | 8/1993 | Nishiguchi ............................ 358/500 |
| 5,422,756 | 6/1995 | Weber ................................... 359/487 |
| 5,598,067 | 1/1997 | Vincent et al. ...................... 315/169.3 |

FOREIGN PATENT DOCUMENTS 6-84505  3/1994  Japan .

*Primary Examiner*—Kimberly A. Williams
*Attorney, Agent, or Firm*—Fitzpatrick, Cella, Harper & Scinto

[57] ABSTRACT

In an image reading apparatus provided with a light source for illuminating an original, the light source includes a fluorescent lamp having a tube surface by means of which a part of a beam of light therefrom is condensed on the surface of the original by the optical action thereof, a line sensor for reading image information of the original and an optical device for causing image information of the original illuminated with the beam of light from the light source to be imaged on the line sensor.

8 Claims, 12 Drawing Sheets

6,118,555

IMAGE READING APPARATUS HAVING A LIGHT SOURCE INCLUDING A FLUORESCENT LAMP

BACKGROUND OF THE INVENTION

1. Field of the Invention

This invention relates to an image reading apparatus, and particularly to an image reading apparatus using image pickup means (reading means) comprising a plurality of light receiving elements such as CCDs arranged in a one-dimensional direction to highly accurately read the image information of an original such as film or OHP while achieving the efficiency of utilization of illuminating light.

2. Related Background Art

As image reading apparatuses using reading means such as a CCD to read an original such as film or OHP, there are widely known constructions as shown in FIGS. 1 and 2 of the accompanying drawings.

FIG. 1 is a schematic view of the essential portions of a reflection type image reading apparatus according to the prior art. In a reading head 103, there are disposed two light sources 104A and 104B, two reflectors 105A and 105B corresponding to the light sources 104A and 104B, an imaging optical system 106 and a line sensor 107. An original 101, shown placed on an original support glass table 102, illuminated with beams of light from the light sources 104A and 104B is imaged on the line sensor 107 by the imaging optical system 106. In FIG. 1, a reading head 103 is scanned in the direction of arrow A to thereby effect the reading of the reflection type original.

FIG. 2 is a schematic view of the essential portions of a transmission type image reading apparatus according to the prior art. In FIG. 2, a beam of light from a light source 104c and a beam of light emitted from the light source 104c toward a reflecting mirror 105c and reflected by the reflecting mirror 105c are condensed by a condenser lens 108 to thereby illuminate a transmission type original 109. The original 109 is imaged on a line sensor 107 by an imaging optical system 106. The light source 104c and the pupil of the imaging optical system 106 are adapted to be in conjugate relationship with each other. In FIG. 2, the line sensor 107 is scanned in the direction of arrow B to thereby perform the reading of the transmission type original.

Light source means used in the prior-art image reading apparatuses merely emits a beam of light and the light source itself has no optical condensing action. Therefore, the quantity of illuminating light onto the surface of an original is liable to be deficient, and this has led to the problem that the reading speed of the image reading apparatus is limited.

As methods of solving these problems, there are the following methods.

(1) A method of driving the light source with a high voltage to increase the luminance of the light source itself. This method, however, gives rise to the problem that a tube forming the light source becomes bulky to thereby make the entire apparatus bulky and the amount of generated heat beams great causing the apparatus to become hot.

(2) A method of mounting near the light source a reflector for reflecting that part of the beam of light emitted from the light source which is emitted toward the side opposite to the original toward the original side. This method, however, gives rise to the problem that the entire apparatus becomes bulky and necessitates an increase in the number of parts that complicates the entire apparatus.

Further, there arises the problem that in order to effect efficient illumination, adjusting means for setting the relative positional relation between the light source and the reflector to predetermined accuracy is required.

SUMMARY OF THE INVENTION

It is a first object of the present invention to provide an image reading apparatus in which each element of a fluorescent lamp constituting light source means for illuminating an original is appropriately set to thereby achieve the simplification of the entire apparatus and yet which is good in illuminating efficiency and compact as a whole and can read image information at a high speed.

The image reading apparatus of the present invention is characterized in (1-1) that when the image information of a transmission type original illuminated with a beam of light from the light source means is to be imaged, by imaging means, on the surface of reading means in which a plurality of picture elements are one-dimensionally arranged in a main scanning direction and the original and the reading means are to be moved relative to each other in a sub scanning direction substantially orthogonal to the main scanning direction to thereby read the original, the light source means has a fluorescent lamp and the fluorescent lamp causes a part of a beam of light from the fluorescent lamp to be condensed on the surface of the original by the optical action of the tube surface thereof.

Particularly, it is characterized in (1-1-1) that the tube surface of the fluorescent lamp comprises at least one reflecting surface or/and transmitting surface differing in refractive power in the main scanning section and in the sub scanning section, and (1-1-2) that the tube surface comprises a cylindrical surface, a toric surface or a Fresnel surface.

It is characterized in (1-2) that when the image information of a transmission type original illuminated with a beam of light from the light source means is to be imaged, by imaging means, on the surface of reading means in which a plurality of picture elements are one-dimensionally arranged in a main scanning direction and the original and the reading means are to be moved relative to each other in a sub scanning direction substantially orthogonal to the main scanning direction to thereby read the original, the light source means has a fluorescent lamp and the fluorescent lamp condenses a beam of light therefrom by the optical action of the tube surface thereof so as to become a linear beam of light on the surface of the original in the main scanning section.

Particularly, it is characterized in (1-2-1) that the fluorescent lamp condenses the beam of light therefrom in the sub scanning section toward the entrance pupil surface of the imaging means by the optical action of the tube surface thereof, (1-2-2) that the tube surface of the fluorescent lamp comprises at least one reflecting surface or/and transmitting surface differing in refractive power in the main scanning section and in the sub scanning section, and (1-2-3) that the tube surface comprises a cylindrical surface, a toric surface or a Fresnel surface.

It is an image recording apparatus in which a transmission type original is illuminated with a beam of light from light source means, the original is projected onto reading means comprising a plurality of light receiving elements arranged in one direction by imaging means and the image on the surface of the original is read by the use of a signal from the reading means, characterized in (1-3) that the light source means is a fluorescent lamp and at least some of a beam of light reflected on and/or transmitted through the tube surface of the fluorescent lamp is condensed on the surface of the original by the reflecting action and or the transmitting action.

It is characterized in (1-3-1) that said at least some of the beam of light is condensed on the surface of the original in the arrangement section of the plurality of light receiving elements of the reading means, and (1-3-2) that said at least some of the beam of light is condensed on the entrance pupil surface of the imaging means in a plane perpendicular to the arrangement section of the plurality of light receiving elements.

It is a second object of the present invention to provide an image reading apparatus in which light source means for illuminating an original is comprised of a cathode tube and that tube surface of the cathode tube which is opposed to the surface of the original is made flat relative to the surface of the original to thereby achieve the simplification of the entire apparatus and yet which is good in illuminating efficiency and more compact as a whole and can read the image information of the original at a high speed.

It is a third object of the present invention to provide an image reading apparatus in which light source means for illuminating an original is comprised of a cathode tube having a fluorescent surface and the fluorescent surface of the cathode tube is made flat relative to the surface of the original to thereby increase illuminating efficiency and which can read the image information of the original at a high speed.

It is a fourth object of the present invention to provide an image reading apparatus in which light source means for illuminating an original is comprised of a cathode tube having a fluorescent surface and that tube surface of the cathode tube which is opposed to the surface of the original is made flat relative to the surface of the original or/and the fluorescent surface of the cathode tube is made flat relative to the surface of the original to thereby achieve the simplification of the entire apparatus and which is good in illuminating efficiency and more compact as a whole and can read the image information of the original at a high speed.

It is a fifth object of the present invention to provide an image reading apparatus in which in the above second, third and fourth objects, reading means is comprised of a line sensor (CCD) to thereby make the apparatus simple and compact and which is good in illuminating efficiency and can read black-and-white image information at a high speed.

It is a sixth object of the present invention to provide an image reading apparatus in which in the above second, third and fourth object, reading means is comprised of a 3-line sensor in which three line sensors are juxtaposed in the sub scanning direction and color resolving means is provided to thereby make the apparatus simple and compact and which is good in illuminating efficiency and can read colored image information at a high speed.

It is a seventh object of the present invention to provide an image reading apparatus in which in the above second, third and fourth objects, reading means is comprised of an area sensor to thereby make the apparatus simple and compact without providing a driving mechanism for the sensor and which is good in illuminating efficiency and can read the image information of the original at a high speed.

The image reading apparatus of the present invention is characterized in (2-1) that when the image information of an original illuminated with a beam of light from the light source means is to be imaged on the surface of the reading means by imaging means and the image information of the original is to be read, the light source means has a cathode tube and the tube surface of the cathode tube which is opposed to the surface of the original comprises a flat surface relative to the surface of the original.

It is characterized in (2-2) that when the image information of an original illuminated with a beam of light from the light source means is to be imaged on the surface of the reading means by imaging means and the image information of the original is to be read, the light source means has a cathode tube having a fluorescent surface and the fluorescent surface of the cathode tube comprises a flat surface relative to the surface of the original.

It is characterized in (2-3) that when the image information of an original illuminated with a beam of light from the light source means is to be imaged on the surface of the reading means by imaging means and the image information of the original is to be read, the light source means has a cathode tube having a fluorescent surface and that tube surface of the cathode tube which is opposed to the surface of the original comprises a flat surface relative to the surface of the original or/and the fluorescent surface of the cathode tube comprises a flat surface relative to the surface of the original.

Particularly, in items (2-1), (2-2) and (2-3) above, the reading means is characterized by comprising a line sensor in which a plurality of picture elements are one-dimensionally arranged in the main scanning direction, the reading means is characterized by comprising a 3-line sensor in which three line sensors in each of which a plurality of picture elements are one-dimensionally arranged in the main scanning direction are juxtaposed in the sub scanning direction, and the reading means is characterized by comprising an area sensor in which a plurality of picture elements are one-dimensionally arranged in the main scanning direction and the sub scanning direction.

It is an eighth object of the present invention to provide an image reading apparatus in which the shape of the light beam emitting surface (tube surface) of light source means for illuminating an original and each element constituting the light source means are appropriately set, whereby a beam of light capable of entering from the object side of imaging means into an effective diameter via the original can be increased to thereby achieve a higher reading speed.

The image reading apparatus of the present invention is characterized in (3-1) that when the image information of an original illuminated with a beam of light from the light source means is to be imaged, by the imaging means, on the surface of reading means in which a plurality of picture elements (pixels) are one-dimensionally arranged in a main scanning direction, and the original and the reading means are to be moved relative to each other in a sub scanning direction substantially orthogonal to the main scanning direction to thereby read the original, the cross-sectional shape of that surface of the light source means which emits the beam of light and is adjacent to the surface of the original comprises a flat surface relative to the main scanning direction and comprises a concave surface relative to the sub scanning direction.

It is characterized in (3-2) that when the image information of an original illuminated with a beam of light from the light source means is to be imaged, by the imaging means, on the surface of reading means in which a plurality of picture elements are one-dimensionally arranged in a main scanning direction, and the original and the reading means are to be moved relative to each other in a sub scanning direction substantially orthogonal to the main scanning direction to thereby read the original, the light source means has a fluorescent lamp and the cross-sectional shape of that tube surface of the fluorescent lamp which emits the beam of light and is adjacent to the surface of the original comprises a flat surface relative to the main scanning direction and comprises a concave surface relative to the sub scanning direction, and a fluorescent material is applied to the inner side of the tube surface.

It is characterized in (3-3) that when the image information of an original illuminated with a beam of light from the light source means is to be imaged, by the imaging means, on the surface of reading means in which a plurality of picture elements are one-dimensionally arranged in a main scanning direction, and the original and the reading means are to be moved relative to each other in a sub scanning direction substantially orthogonal to the main scanning direction to thereby read the original, the light source means has a fluorescent lamp and the cross-sectional shape of that tube surface of the fluorescent lamp which emits the beam of light and faces the surface of the original comprises a flat surface relative to the main scanning direction and comprises a concave surface relative to the sub scanning direction, and in the fluorescent lamp a fluorescent material is applied to an inner surface of the tube surface and an inner surface of the tube surface opposite to the tube surface located at the surface side of the original.

Particularly, it is characterized in that in item (3-2) and (3-3) above, in the cross-section in the sub scanning direction, the angle defined by spreading from a point on the surface of the original to the effective diameter of that tube surface of the fluorescent lamp located at the surface side of the original is set so as to be substantially equal to the angle defined by spreading from said point to the diameter of the entrance pupil of the imaging means, and in the cross-section in the sub scanning direction, the shape of a tube surface of the fluorescent lamp opposed to the tube surface located at the surface side of the original therein comprises a flat surface, and in the cross-section in the sub scanning direction, the shape of that tube surface of the fluorescent lamp opposed to the tube surface located at the surface side of the original therein comprises a concave surface having the same polarity as that of the tube surface located at the surface side of the original, and reflecting means for reflecting the beam of light in the fluorescent lamp is provided on the outer surface of the tube surface opposite to the tube surface located at the surface side of the original and that tube surface of the fluorescent lamp located at the surface side of the original comprises a concave cylindrical surface.

It is characterized in (3-4) that when image information of an original illuminated with a beam of light from the light source means is to be imaged, by the imaging means, on the surface of reading means in which a plurality of picture elements are one-dimensionally arranged in a main scanning direction, and the original and the reading means are to be moved relative to each other in a sub scanning direction substantially orthogonal to the main scanning direction to thereby read the original, the light source means has a diffusing plate formed so as to cover the range of a one-dimensional reading area on the surface of the original in the main scanning direction, and a light source unit in which a plurality of incandescent lamps are arranged in each of the main scanning direction and the sub scanning direction, and the cross-sectional shape of the diffusing surface of the diffusing plate which faces the surface of the original comprises a flat surface relative to the main scanning direction and comprises a concave surface relative to the sub scanning direction, and the plurality of incandescent lamps are arranged in each of the main scanning direction and the sub scanning direction along the outer side surface of the diffusing plate.

It is characterized in (3-5) that when image information of an original illuminated with a beam of light from the light source means is to be imaged, by the imaging means, on the surface of reading means in which a plurality of picture elements are one-dimensionally arranged in a main scanning direction, and the original and the reading means are to be moved relative to each other in a sub scanning direction substantially orthogonal to the main scanning direction to thereby read the original, the light source means has a light source unit in which a plurality of light emitting diodes are arranged in each of the main scanning direction and the sub scanning direction so as to cover the range of a one-dimensional reading area on the surface of the original in the main scanning direction, and the state of arrangement of the plurality of light emitting diodes constituting the light source unit is flat configuration relative to the main scanning direction and is concave configuration relative to the sub scanning direction.

DESCRIPTION OF THE PREFERRED EMBODIMENTS

Figure 3A:
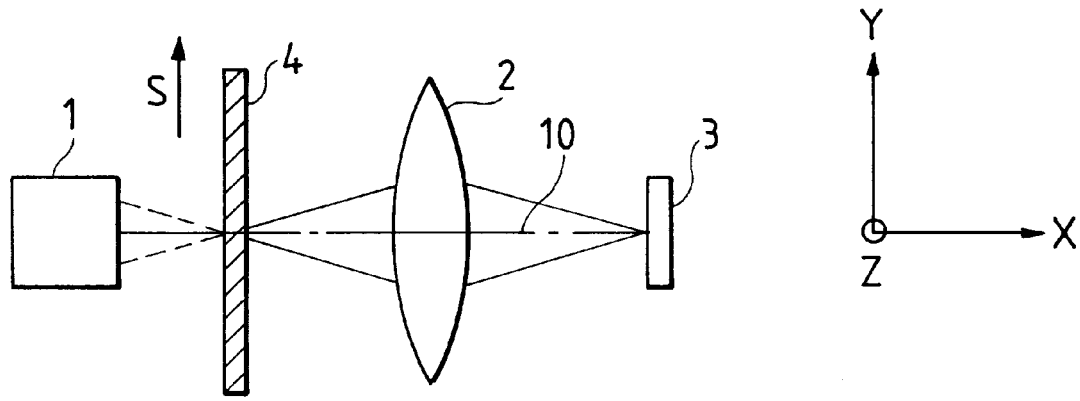
FIGS. 3A and 3B are schematic views of the essential portions of Embodiment 1 of the image reading apparatus of the present invention.
Figure 3B:
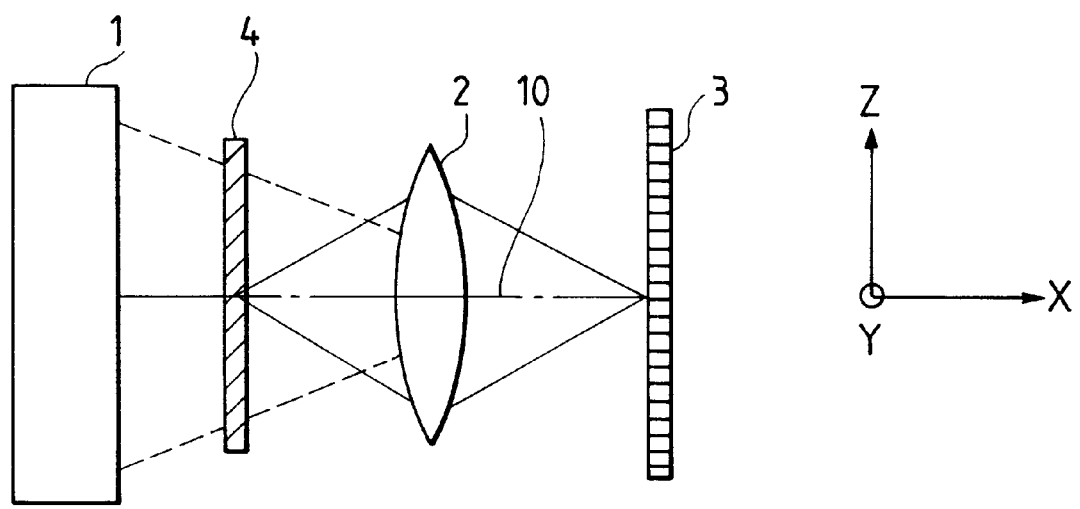

FIGS. 3A and 3B are schematic views of the essential portions of Embodiment 1 of the present invention, and show an image reading apparatus for reading transmission type originals. FIG. 3A shows a sub scanning section and FIG. 3B shows a main scanning section.

In this embodiment (hereinafter likewise), in the optical path from light source means 1, in a plane orthogonal to the optical axis, a direction corresponding to the direction of arrangement of the plurality of light receiving elements of reading means 3 is a main scanning direction, and a direction orthogonal thereto is a sub scanning direction.

In FIGS. 3A and 3B, reference numeral 3 designates a one-dimensional line sensor (reading means) which comprises a plurality of light receiving elements such as CCD one-dimensionally arranged in the main scanning direction. Reference numeral 2 denotes imaging means comprising an imaging lens, by which image information of an original 4 which will be described later is focused on the surface of the reading means 3. Reference numeral 4 designates a transmission type original such as film, on which image information to be read is formed.

Figure 4A:
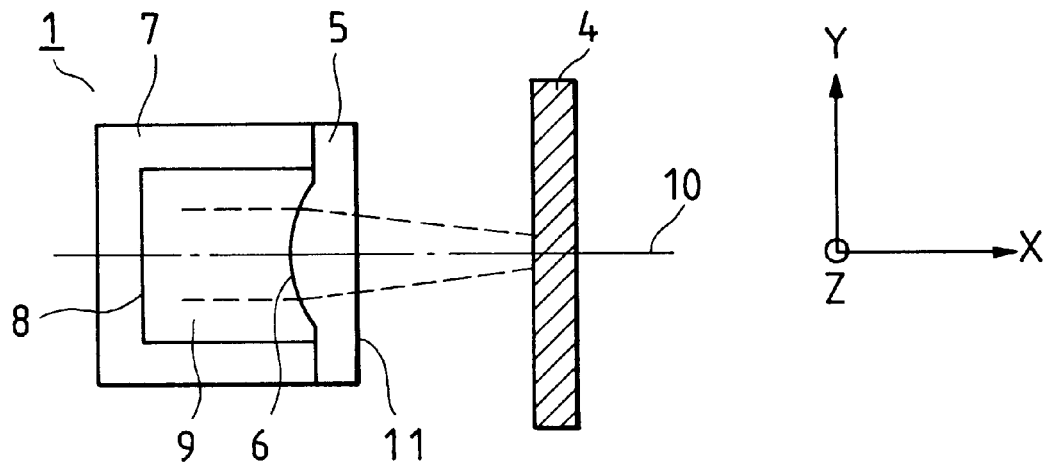
FIGS. 4A and 4B are illustrations of a portion of the FIG. 3 apparatus.
Figure 4B:
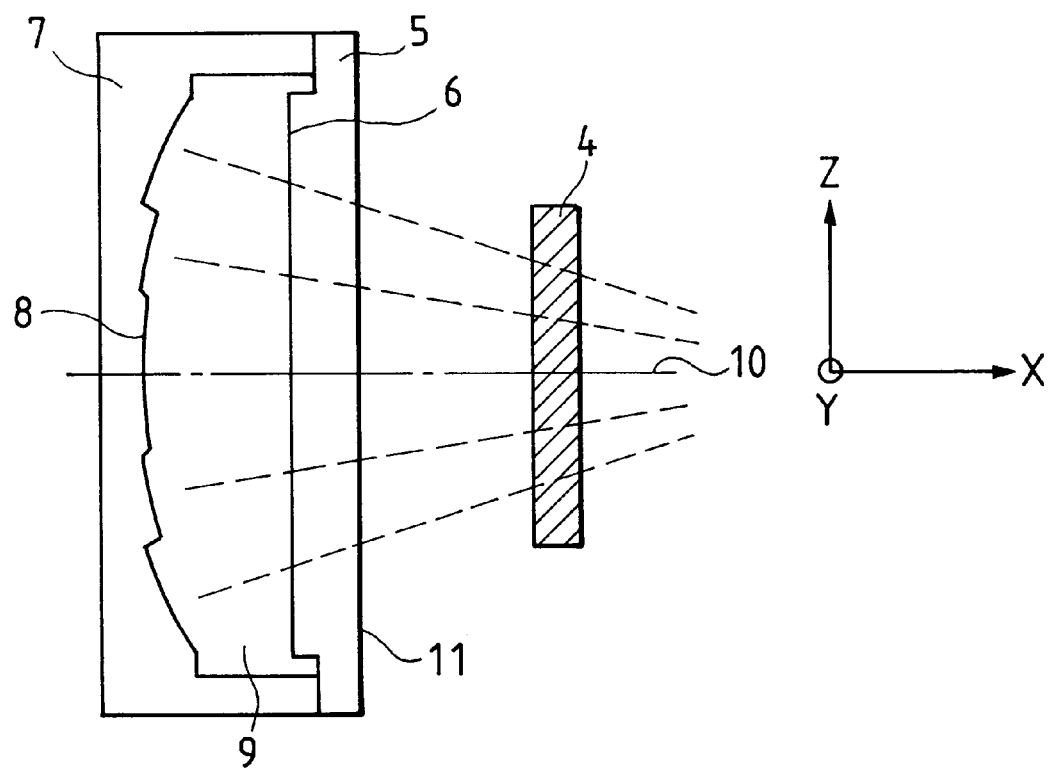

Reference numeral 1 denotes light source means comprising a fluorescent lamp of such construction as shown in FIGS. 4A and 4B. FIG. 4A shows a sub scanning section containing the optical axis 10 of the imaging optical system 2, and FIG. 4B shows a main scanning section containing the optical axis 10 of the imaging optical system 2.

In Embodiment 1, at least one tube surface constituting a fluorescent lamp is made into a spherical or aspherical surface of an appropriate shape, for example, a curved surface such as a toric surface. By the optical action of this tube surface, a part of a beam of light from the fluorescent lamp 1 is condensed so as to become a linear beam of light on the surface of the original 4 in the sub scanning section of FIG. 3A. That is, critical illumination is done.

In the main scanning section of FIG. 3B, a part of the beam of light from the fluorescent lamp 1 is condensed on the entrance pupil surface of the imaging means 2. That is, öhler illumination is done.

In Embodiment 1, when the original 4 is to be illuminated with the beam of light from the light source means 1, the beam of light is made into a slit-like beam of light (a linear beam of light) long in the main scanning direction to thereby achieve the utilization efficiency of the light and yet the image information on the original 4 is imaged on the reading means 3 at a predetermined magnification by the imaging means 2. The relative position of the original 4 and the reading means 3 is changed and in the present embodiment, the original 4 is moved (scanned) in the direction of arrow S (the sub scanning direction) to successively read the two-dimensional image information on the surface of the original 4 by the reading means 3.

Description will now be made of the construction of the fluorescent lamp 1 in the present embodiment shown in FIGS. 4A and 4B. The fluorescent lamp 1 comprises a first member 5 formed of a transparent glass block and a second member 7 formed of a transparent glass block or a metallic material which are brought into close contact with each other so as to provide a tube having a hollow portion 9 long in a direction (the main scanning direction) perpendicular to the plane of the drawing sheet of FIG. 4A. Mercury gas, argon gas, xenon gas or the like is enclosed in the hollow portion 9 in the tube. As the fluorescent lamp 1, use is made of a cold cathode tube which generates little heat in the tube and can be disposed in proximity to the original and moreover is excellent in illuminating efficiency, because when silver salt film or the like is used as the transmission type original, the original may be warped and deformed due to the characteristic of the material thereof if a heat generating member is present near it, and this is not preferable.

A fluorescent material is applied to the inner wall (tube surface) 6 of the first member 5. The inner wall 6 has a curvature only in its cross-section shown in FIG. 4A. That is, the inner wall 6 has a refracting action as a cylindrical lens to the beam of light from the hollow portion side. By this one-directional refracting action, a part of the beam of light passing through the inner wall 6 is condensed into a linear shape on the original 4 in the cross-section shown in FIG. 4A.

The outer wall 11 of the first member 5 is of flat structure. Thereby, the setting of the distance and angle of the fluorescent lamp 1 relative to the original 4 is facilitated. The outer wall 11 may be made into a diffusing surface having a gentle diffusing characteristic, and if this is done, there will be the effect that the degree of condensation of the beam of light condensed on the original 4 in the cross-section shown in FIG. 4A is somewhat moderated. Also, the beam of light passed through the original 4 is condensed on the reading means 3 through the imaging optical system 2, but if the degree of condensation by the diffusing surface is somewhat moderated, there will be the effect that the width of the illuminating area in the cross-section shown in FIG. 4A can be widened and the accuracy required for the positioning of the reading means is alleviated.

Reflecting film is formed on the inner wall (tube surface) 8 of the second member 7 and a fluorescent material is applied thereto to thereby increase the quantity of reflected light travelling toward the original 4. The inner wall 8 comprises cylindrical Fresnel structure having a curvature only in the cross-section shown in FIG. 4B. In FIG. 4B, the beam of light reflected by the inner wall 8 is condensed toward the entrance pupil of the imaging optical system, not shown.

In Embodiment 1, as described above, the shapes of the first member 5 and second member 7 constituting the fluorescent lamp 1 are specified so as to condense the beam of light from the fluorescent lamp 1 at different positions in the main scanning section and the sub scanning section, whereby the surface of the original 4 is efficiently illuminated.

Particularly, in Embodiment 1, at least a part of the beam of light reflected on and/or transmitted through the tube surface of the fluorescent lamp may be condensed onto the surface of the original by the reflecting action and/or the transmitting action, whereby the beam of light passing through the tube surface of the fluorescent lamp is efficiently condensed onto the surface of the original to thereby effect efficient illumination. Thereby, a higher reading speed is achieved and the number of parts is decreased and the downsizing of the entire apparatus and a reduction in the consumption of electric power are achieved. The utilization of the tube surface of the fluorescent lamp 1 is not restricted to the utilization of the inner wall alone.

Figure 5A:
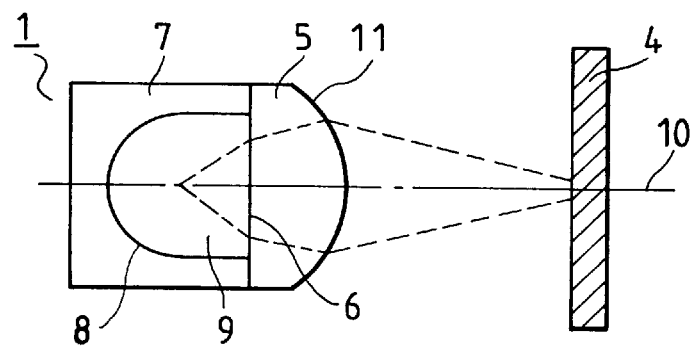
FIGS. 5A and 5B are schematic views of the essential portions of Embodiment 2 of the image reading apparatus of the present invention.
Figure 5B:
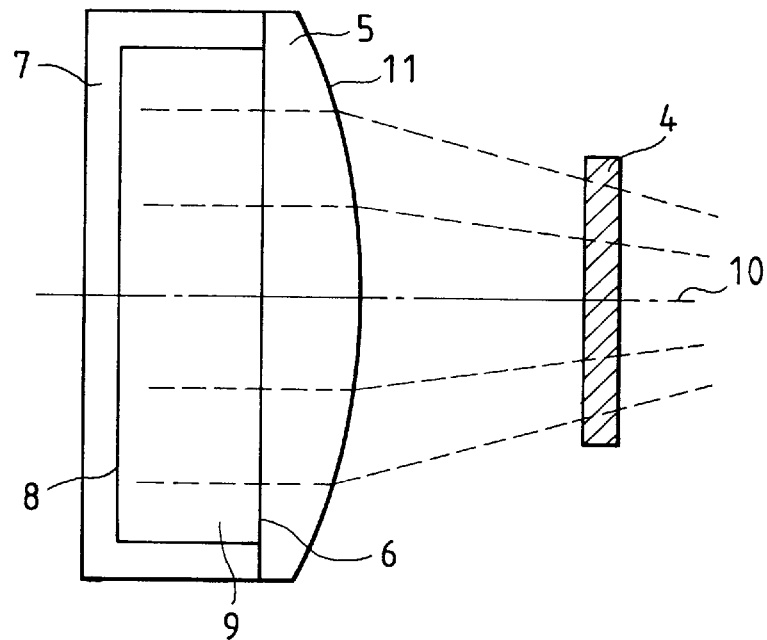

FIGS. 5A and 5B are schematic views of the essential portions of Embodiment 2 of the present invention in the sub scanning section and the main scanning section, respectively, showing the state of disposition of the light source means 1 and the original.

The fluorescent lamp 1 constituting the light source means 1 comprises a first member 5 and a second member 7, of which the first member 5 is such that the outer wall 11 thereof comprises a toric surface shape differing in refractive power between the main scanning direction and the sub scanning direction and the inner wall 6 thereof comprises a flat surface. Also, the second member 7 is such that the inner wall 8 thereof comprises a shape having a reflecting curved surface only in the sub scanning section.

In Embodiment 2, such fluorescent lamp 1 is used to thereby obtain an effect similar to that of Embodiment 1.

Figure 6:
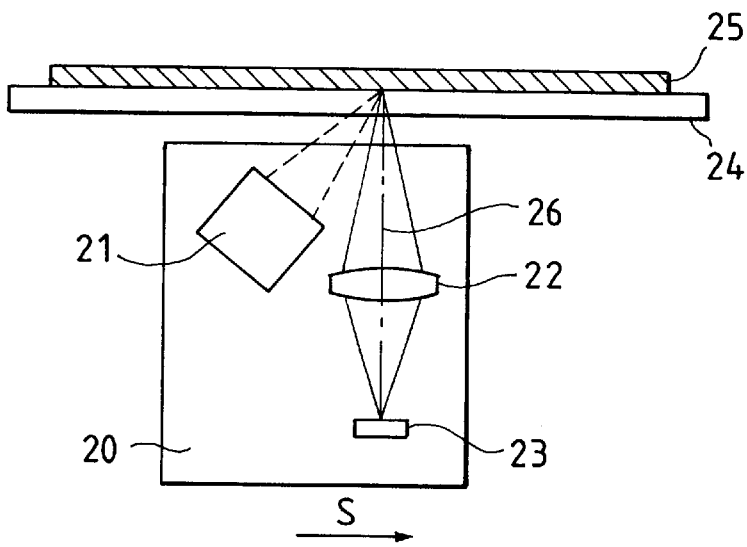
FIG. 6 is a schematic view of the essential portions of Embodiment 3 of the present invention.

FIG. 6 is a schematic view of the essential portions of Embodiment 3 of the present invention in the sub scanning section. This embodiment is an image reading apparatus for reading reflection type originals.

Figure 7A:
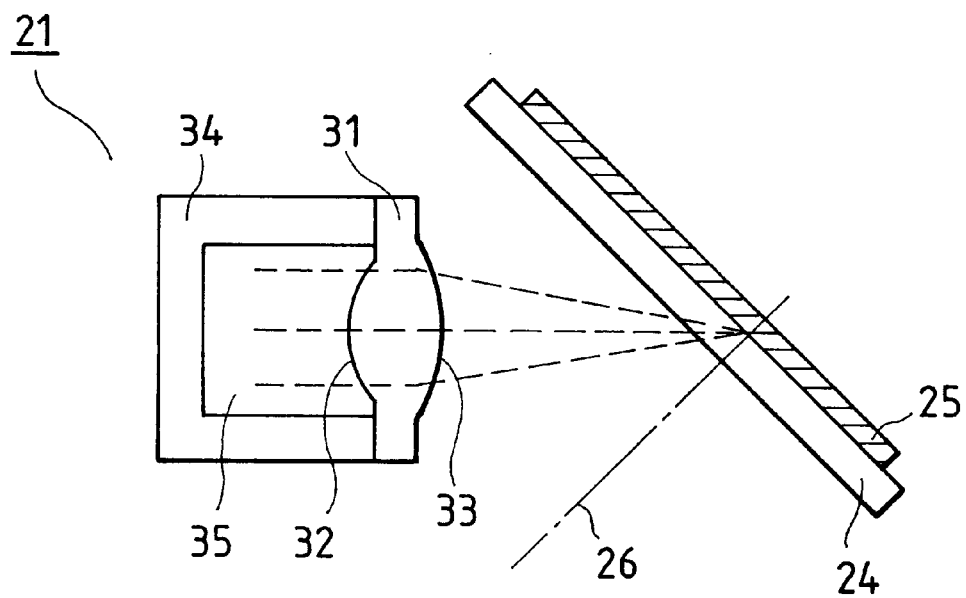
FIGS. 7A and 7B are illustrations of a portion of the FIG. 5 apparatus.
Figure 7B:
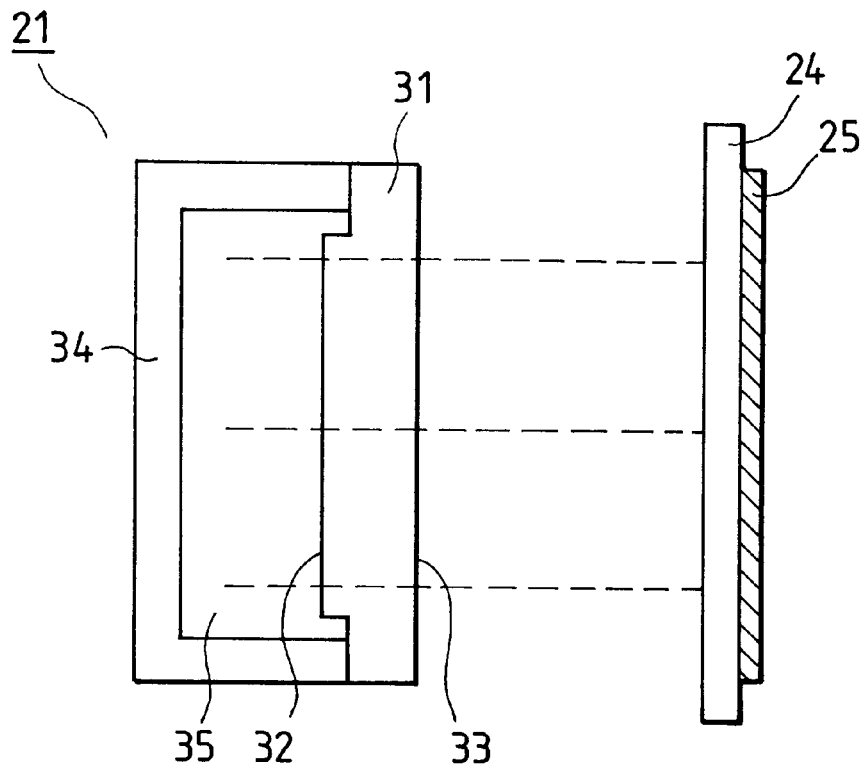

FIGS. 7A and 7B are schematic views of the essential portions of the light source means 21 of FIG. 6 in the sub scanning section and the main scanning section, respectively. In FIG. 6, reference numeral 21 designates light source means which illuminates an original 25 with a slit-like beam of light long in the main scanning direction (a direction perpendicular to the plane of the drawing sheet of FIG. 6). The original 25 rests on a glass original supporting table 24. Reference numeral 23 denotes reading means which comprises a plurality of light receiving elements arranged in one direction (the main scanning direction). Reference numeral 22 designates an imaging optical system which causes image information on the surface of the original 25 illuminated with the beam of light from the light source means 21 to be imaged on the reading means 23. Reference numeral 26 denotes the optical axis of the imaging optical system 22. The light source means 21, the imaging optical system 22 and the reading means 23 are contained in a housing to thereby constitute a reading head 20.

In Embodiment 3, a beam of light scattered by the original 25 is used to effect the reading of the image information by the reading means 23. The reading head 20 is moved (scanned) in the direction of arrow S to thereby change the relative position of the original 25 and the reading head 20 and two-dimensionally read the image information on the surface of the original 25.

The fluorescent lamp 21 constituting the light source means 21 in Embodiment 3 is such that as shown in FIGS. 7A and 7B, a first member 31 formed of a glass block and a second member 34 formed of a glass block or a metallic material are brought into close contact with each other to thereby constitute a tube having a hollow portion 35.

The inner wall (tube surface) 32 and outer wall (tube surface) 33 of the first member 31 are of a cylindrical lens shape having refractive power only in the sub scanning section. Thereby, the beam of light from the hollow portion 35 is condensed only in the sub scanning section and the surface of the original 25 is illuminated with a linear beam of light.

In Embodiment 3, an effect similar to that of Embodiment 1 is obtained by the above-described construction.

As described above, the image reading apparatus of the present invention is characterized in that when the image information on the transmission type original illuminated with the beam of light from the light source means is to be imaged, by the imaging means, on the surface of the reading means in which a plurality of picture elements are one-dimensionally arranged in the main scanning direction and the original and the reading means are to be moved relative to each other in the sub scanning direction substantially orthogonal to the main scanning direction, the light source means has a fluorescent lamp which condenses a part of the beam of light therefrom on the surface of the original by the optical action of the tube surface thereof.

According to the present invention, as described above, there can be achieved an image reading apparatus in which each element of the fluorescent lamp constituting the light source means for illuminating the original is appropriately set to thereby achieve the simplification of the entire apparatus and which is good in illuminating efficiency and compact as a whole and can read image information at a high speed.

Further embodiments of the image reading apparatus of the present invention will be described hereinafter.

Figure 8:
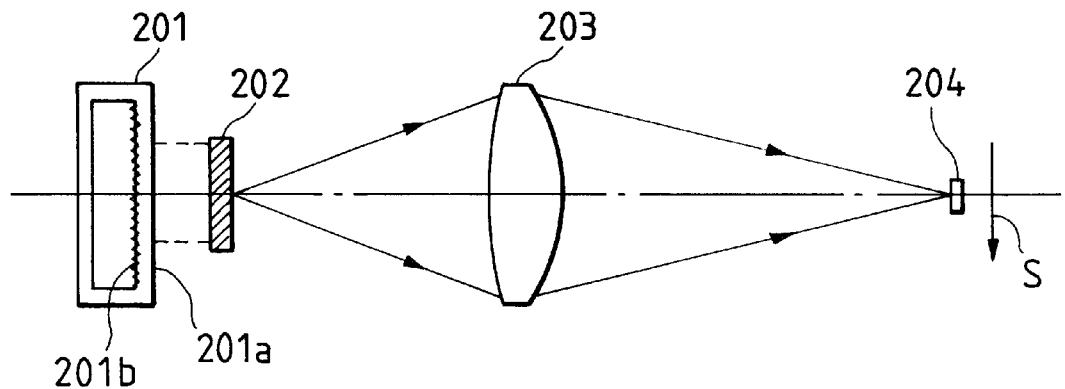
FIG. 8 is a schematic view of the essential portions of Embodiment 4 of the image reading apparatus of the present invention.

FIG. 8 is a schematic view (a sub scanning sectional view) of the essential portions of Embodiment 4 of the present invention, and shows an image reading apparatus for reading transmission type originals.

In Embodiment 4, in the optical path from light source means 201, in a plane orthogonal to the optical axis, a direction corresponding to the direction of arrangement of the plurality of picture elements (light receiving elements) of reading means 204 is defined as the main scanning direction and a direction orthogonal thereto is defined as the sub scanning direction.

In FIG. 8, reference numeral 201 designates light source means comprising a cathode tube (a cold cathode tube) having a fluorescent surface and provided near a transmission type original 202 which will be described later. In Embodiment 4, the cathode tube 201 is such that a tube surface (opposed surface) 201a opposed to the surface of the original 202 and a fluorescent surface 201b are both formed by a flat surface relative to the surface of the original 202. In Embodiment 4, that tube surface 201a of the cathode tube 201 located at the original side and the fluorescent surface 201b are both formed by a flat surface, but at least one surface can be a flat surface. The light source means (cathode tube) 201 will hereinafter be referred to as the "flat light source".

Reference numeral 202 denotes a transmission type original such as film on which image information to be read is formed. The reference numeral 203 designates imaging means which comprises an imaging lens (an imaging optical system) and causes the image information on the original 202 to be imaged on the surface of reading means 204 which will be described later. Reference numeral 204 denotes a one-dimensional line sensor (CCD) as reading means in which a plurality of picture elements are one-dimensional arranged in the main scanning direction.

The original reading operation of Embodiment 4 will now be described.

The flat light source 201 is constructed so as to become a tube having a hollow portion long in a direction (the main scanning direction) perpendicular to the plane of the drawing sheet of FIG. 8, and has mercury gas, argon gas, xenon gas or the like enclosed in the hollow portion in the tube. As the flat light source 201, use is made of a cold cathode tube which generates little heat in the tube and can be disposed in proximity to the original and moreover has a good illuminating effect, because when silver salt film or the like is used as the transmission type original, if a heat generating member is present near it, the original may be warped and deformed due to the characteristic of the material thereof, and this is not preferable. In Embodiment 4, that tube surface of the inner wall of the hollow portion of the flat light source 201 located at the original side is made into a flat surface relative to the surface of the original 202 and a fluorescent material is applied to this flat surface 201b.

Figure 9:
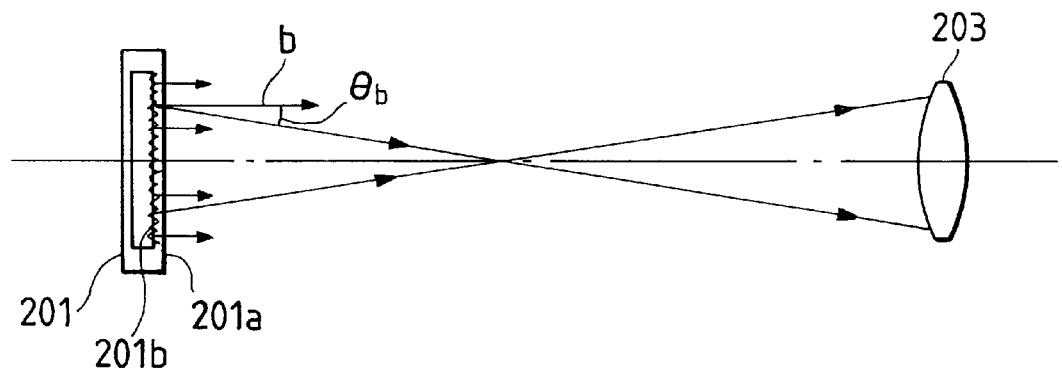
FIG. 9 is a schematic view of the essential portions of Embodiment 4 of the image reading apparatus of the present invention.
Figure 10:
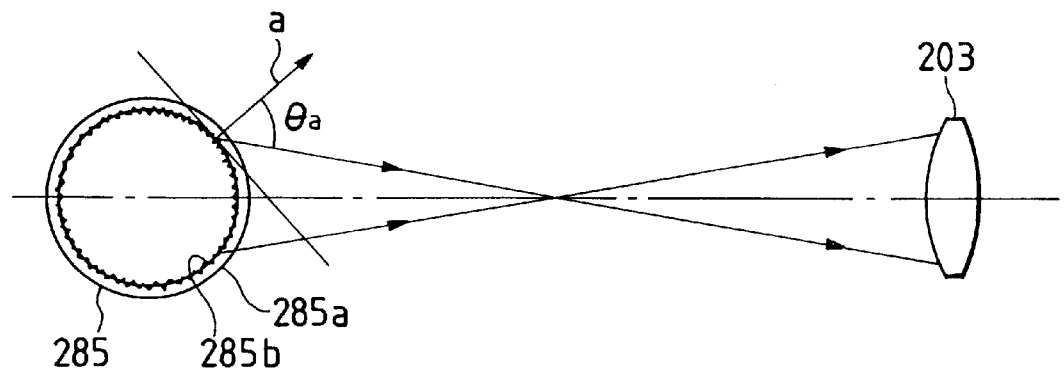
FIG. 10 is a schematic view of the essential portions of an image reading apparatus.

The difference in the illuminating light when the flat light source 201 in Embodiment 4 and a cylindrical light source 285 are compared with each other will be described hereinafter with reference to FIGS. 9 and 10. In FIGS. 9 and 10, the same elements as the elements shown in FIG. 8 are given the same reference numerals.

FIG. 9 is an illustration showing a beam of light emitted from the flat fluorescent surface 201b of the flat light source 201 in Embodiment 4, and FIG. 10 is an illustration showing a beam of light emitted from a circular fluorescent surface 285b of the cylindrical light source 285 for the comparison with the present embodiment.

In FIG. 9, the letter b designates a beam of light which is a component perpendicular to the fluorescent surface 201b, of the beam of light emitted from the fluorescent surface 201b of the flat light source 201, and θb denotes the angle formed by and between the actually applied light and the beam of light b which is the perpendicular component. In FIG. 10, the letter a designates a beam of light which is a component perpendicular to the fluorescent surface 285b, of the beam of light emitted from the fluorescent surface 285b of the cylindrical light source 285, and θa denotes the angle formed by and between the actually applied light and the beam of light a which is the perpendicular component.

When FIGS. 9 and 10 are compared with each other, of the angles θb and θa formed by the beam of light b (flat light source) and the beam of light a (cylindrical light source) perpendicularly emitted from the fluorescent surfaces 201b and 285b respectively, with respect to the actually applied light, the angle θb is a smaller angle. Generally, a beam of light emitted from a fluorescent surface becomes a light beam component highest in intensity as the angle formed by it with respect to the emitting surface is more approximate to perpendicular. That is, the more approximate to 0° is the angle θ, the brighter becomes the light. Consequently, it will be seen that illuminating by the flat light source 201 of Embodiment 4 result in brighter illumination than illuminating by the cylindrical light source.

Thus, in Embodiment 4, of the emitted light from the fluorescent surface 201b of the flat light source 201, the beam of light b of the angle component in which the angle θ formed thereby with respect to the emitting surface is approximate to 0° can be used for the illumination of the transmission type original 202, whereby high-speed reading by brighter illumination can be accomplished.

Figure 11:
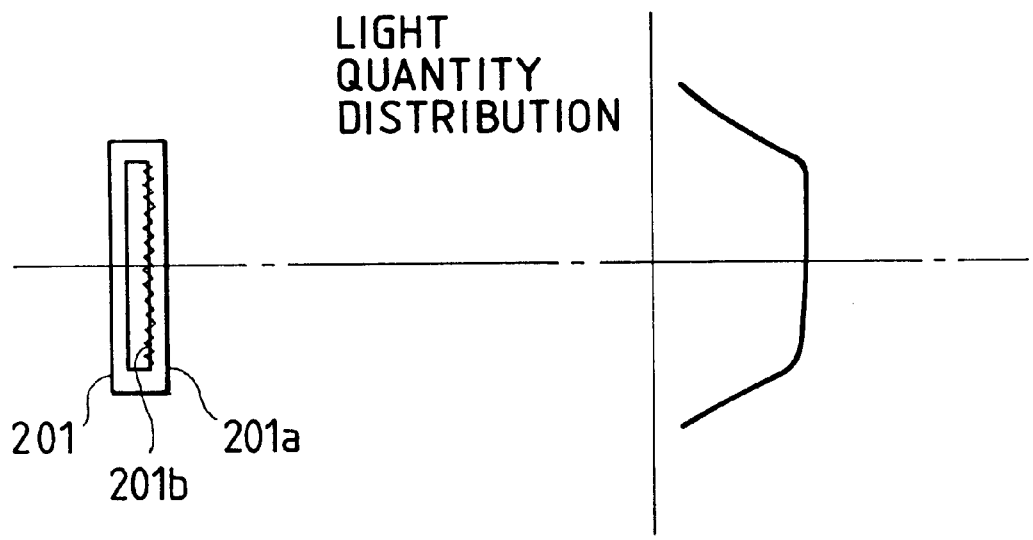
FIG. 11 is an illustration of a portion of Embodiment 4 of the image reading apparatus of the present invention.
Figure 12:
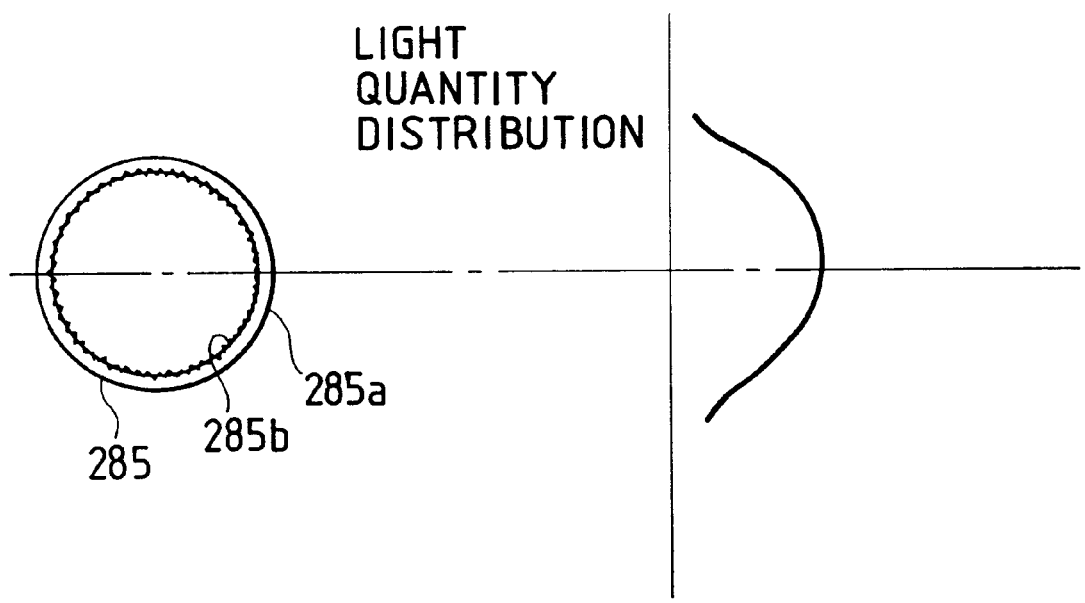
FIG. 12 is an illustration of a portion of an image reading apparatus.

FIGS. 11 and 12 are illustrations showing light quantity distributions when the flat light source 201 of Embodiment 4 and the cylindrical light source 285 are used as the light source means, respectively. As will be seen from FIGS. 11 and 12, the light quantity distribution by the flat light source 201 is flatter than the light quantity distribution by the cylindrical light source 285. By this fact, when the light source is actually incorporated into the apparatus, the adjustment of the position in the sub scanning direction and the positional relationship of rotation or the like can be effected easily in Embodiment 4.

Figure 1:
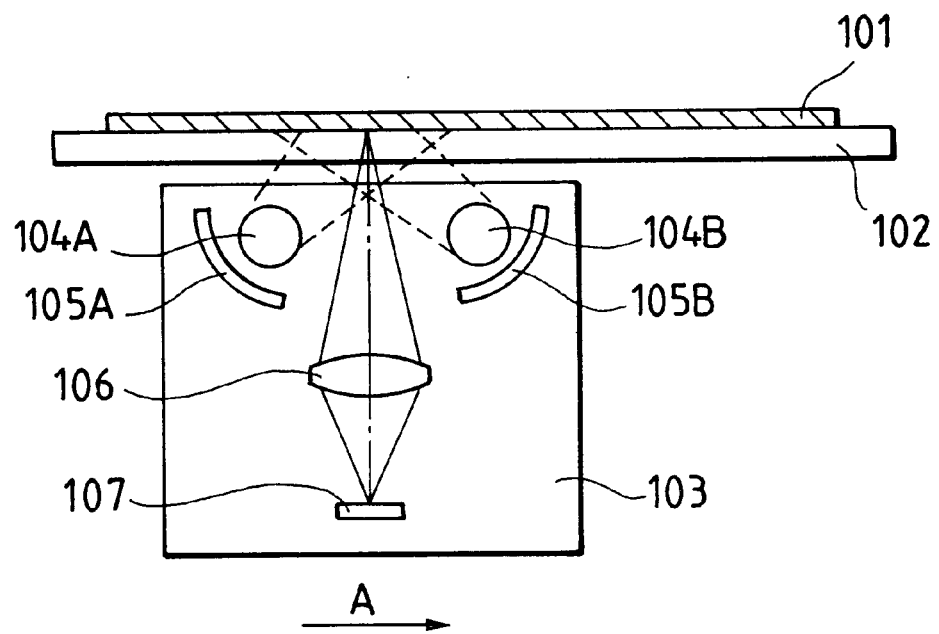
FIG. 1 is a schematic view of the essential portions of an image reading apparatus according to the prior art.
Figure 2:
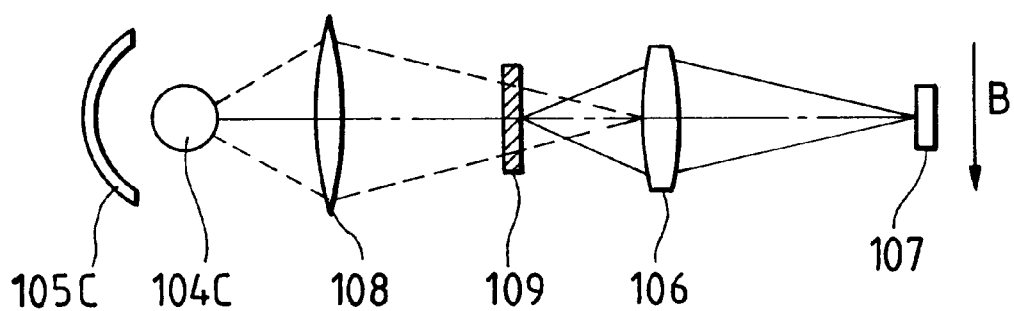
FIG. 2 is a schematic view of the essential portions of an image reading apparatus according to the prior art.

Also, in Embodiment 4, as compared with the prior-art image recording apparatuses shown in FIGS. 1 and 2, a reflecting mirror, a condenser lens, etc. for condensing the beam of light emitted from the light source are not required and therefore, the simplification of the entire apparatus can be achieved and the light source is a flat light source and thus, this flat light source and the original can be disposed in utmost proximity to each other, whereby the transmission type original can be directly illuminated from a close distance and the downsizing of the entire apparatus can also be achieved.

Figure 13:
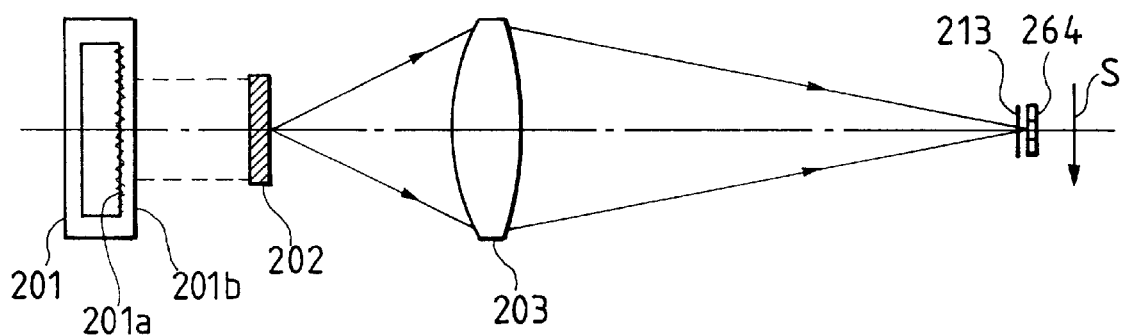
FIG. 13 is a schematic view of the essential portions of Embodiment 5 of the image reading apparatus of the present invention.

FIG. 13 is a schematic view (a sub scanning sectional view) of the essential portions of Embodiment 5 of the present invention. In FIG. 13, the same elements as the elements shown in FIG. 8 are given the same reference numerals.

The difference of Embodiment 5 from the aforedescribed Embodiment 4 is that reading means 204 is comprised of a 3-line sensor and color resolving means is utilized to read colored image information. In the other points, the construction and optical action of embodiment 5 are substantially similar to those of embodiment 4, whereby a similar effect is obtained.

That is, in FIG. 13, reference numeral 264 designates reading means comprising a 3-line sensor in which three line sensors each comprising a plurality of picture elements one-dimensionally arranged in the main scanning direction are juxtaposed in the sub scanning direction. Reference numeral 213 denotes color resolving means provided forwardly of the 3-line sensor 264 and comprising a plurality of color filters for color-resolving a colored image into predetermined color lights, for example, three color lights of red (R), green (G) and blue (B). Color resolving means is not restricted to the above-described means, but may be any means which can resolve a colored image into three color lights R, G and B.

The original reading operation of Embodiment 5 will now be described.

In Embodiment 5, as in the aforedescribed Embodiment 4, a flat light source 201 and an original (colored image) 202 are disposed in proximity to each other, and the original 202 is directly illuminated with a beam of light from the flat light source 201, and colored image information on the original 202 thus illuminated is color-resolved into predetermined three color lights R, G and B by the color resolving means 213 through an imaging lens 203 and is imaged at a predetermined magnification on the surface of the 3-line sensor 264. The relative position of the original 202 and the 3-line sensor 264 are then changed and in Embodiment 5, the 3-line sensor 264 is moved (scanned) in the direction of arrow S (the sub scanning direction) to thereby read two-dimensional colored image information on the surface of the original 202 sequentially by the 3-line sensor 264.

Thus, in Embodiment 5, the colored image information on the original 202 can be read highly accurately and with good illuminating efficiency by a simplified compact apparatus.

Figure 14:
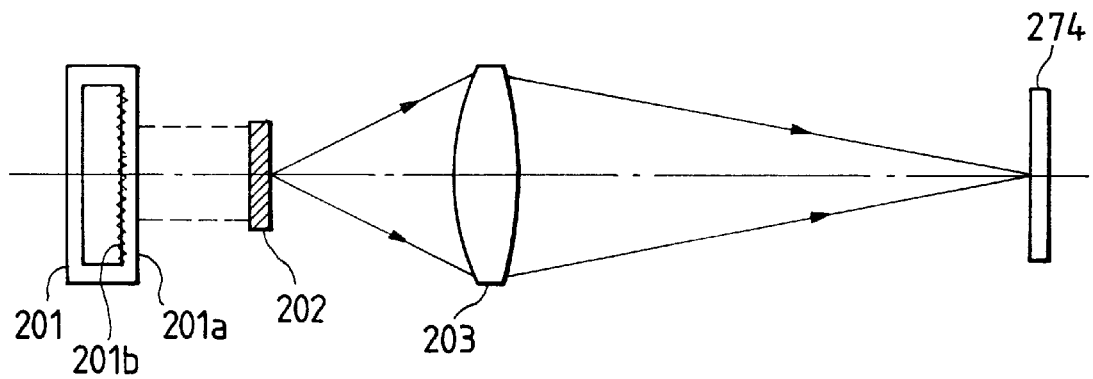
FIG. 14 is a schematic view of the essential portions of Embodiment 6 of the image reading apparatus of the present invention.

FIG. 14 is a schematic view (a sub scanning sectional view) of the essential portions of Embodiment 6 of the present invention. In FIG. 14, the same elements as the elements shown in FIG. 8 are given the same reference numerals.

The difference of Embodiment 6 from the aforedescribed Embodiment 4 is that the reading means is comprised of an area sensor, and in the other points, the construction and optical action of Embodiment 6 are substantially similar to those of Embodiment 4, whereby a similar effect is obtained.

In FIG. 14, reference numeral 274 designates reading means comprising an area sensor in which a plurality of picture elements are two-dimensionally arranged in the main scanning direction and the sub scanning direction.

The original reading operation of Embodiment 6 will now be described.

In Embodiment 6, as in the aforedescribed Embodiment 4, the flat light source 201 and the original 202 are disposed in proximity to each other, and the original 202 is directly illuminated with a beam of light from the flat light source 201, and image information on the thus illuminated original 202 is imaged at a predetermined magnification on the surface of the area sensor 274 and is read.

Thus, in Embodiment 6, as compared with the aforedescribed Embodiment 5, the image information on the original 202 can be read with good illuminating efficiency by a more simplified compact apparatus without a driving mechanism for the sensor unit being provided.

As described above, the image reading apparatus of the present invention is characterized in that when the image information on the original illuminated with the beam of light from the light source means is to be imaged on the surface of the reading means by the imaging means and is to be read, the light source means has a cathode tube and that tube surface of this cathode tube which is opposed to the surface of the original comprises a flat surface relative to the surface of the original.

The present invention can achieve an image reading apparatus which can obtain the effects shown below.

According to the present invention, a cathode tube is used as light source means and that tube surface (the opposed surface) thereof opposed to the surface of an original is formed by a flat surface relative to the surface of the original, whereby the light source and the original can be brought to utmost proximity to each other, whereby the downsizing of the entire apparatus can be achieved and also, the number of constituent members can be reduced as compared with the prior-art image reading apparatus and therefore, the simplification of the entire apparatus can be achieved. Also, the beam of light from the light source means can be effectively utilized and therefore, a greater quantity of light can be obtained, whereby the accumulation time of the sensor can be shortened and thus, image reading at high speed can be accomplished and further, a dark lens of great F number can be used and therefore, a wider degree of freedom can be obtained in lens design.

According to the present invention, a cathode tube having a fluorescent surface is used as light source means and the tube surface thereof opposed to the surface of an original is formed by a flat surface or/and the fluorescent surface of the cathode tube is formed by a flat surface relative to the surface of the original, whereby the light source and the original can be brought to utmost proximity by each other, whereby the downsizing of the entire apparatus can be achieved and also, as compared with the prior-art image reading apparatus, the number of constituent members can be reduced and therefore, the simplification of the entire apparatus can be achieved. Also, the beam of light from the light source means can be effectively utilized and thus, a greater quantity of light can be obtained, whereby the accumulation time of the sensor can be shortened and therefore, image reading at a high speed can be accomplished and further, a dark lens of great F number can be used and thus, a wider degree of freedom can be obtained in lens design.

According to the present invention, reading means is comprised of a line sensor (a one-dimensional line sensor), whereby the reading of black-and-white images can be actually accomplished with good illuminating efficiency by a simplified compact apparatus and high-speed reading of black-and-white images can be accomplished and a dark lens of great F number can be used and therefore, a wider degree of freedom can be obtained in lens design.

According to the present invention, reading means is comprised of a 3-line sensor comprising three line sensors juxtaposed in the sub scanning direction and color resolving means is provided, whereby colored images can be actually read with good illuminating efficiency by a simplified compact apparatus, and high-speed reading of colored images can be accomplished and a dark lens of great F number can be used and therefore, a wider degree of freedom can be obtained in lens design.

According to the present invention, reading means is comprised of an area sensor, whereby a driving mechanism for the sensor is not required and image reading can be actually accomplished with good illuminating efficiency by a more simplified compact apparatus and also, high-speed reading of images can be accomplished and a dark lens of great F number can be used and therefore, a wider degree of freedom may be obtained in lens design.

Further embodiments of the image reading apparatus of the present invention will be de described hereinafter.

Figure 15:
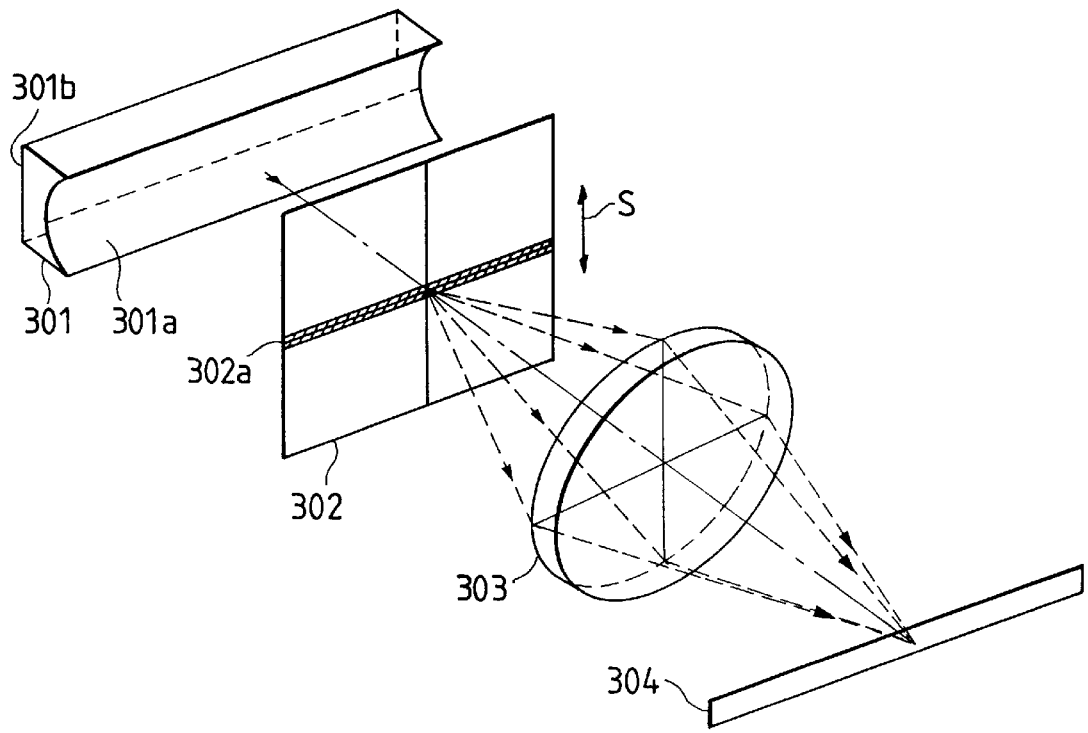
FIG. 15 is a schematic view of the essential portions of Embodiment 7 of the image reading apparatus of the present invention.
Figure 16:
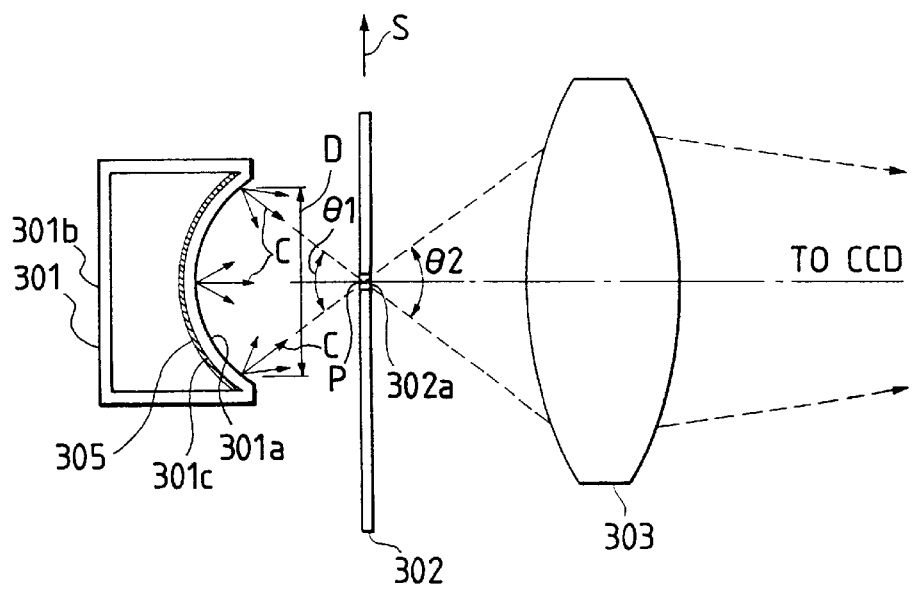
FIG. 16 is a sub scanning sectional view of Embodiment 7 of the image reading apparatus of the present invention.

FIG. 15 is a schematic view of the essential portions of Embodiment 7 of the present invention. FIG. 16 is a cross-sectional view (a sub scanning sectional view) of the essential portions of FIG. 15 in the sub scanning direction.

In Embodiment 7, in the optical path from light source means 301, in a plane orthogonal to the optical axis, a direction corresponding to the direction of arrangement of the plurality of picture elements of reading means 304 is defined as the main scanning direction and a direction orthogonal thereto is defined as the sub scanning direction.

In FIGS. 15 and 16, reference numeral 301 designates light source means comprising a fluorescent lamp such as a hot cathode tube or a cold cathode tube, and this fluorescent lamp is such that the cross-sectional shape of the tube surface 301a thereof emitting a beam of light located at the surface side of an original 302 comprises a flat surface with respect to the main scanning direction (lengthwise direction) of a one-dimensional reading area on the surface of the original 302 and comprises a concave surface with respect to the sub scanning direction (widthwise direction) of the reading area. The tube surface 301a of this fluorescent lamp 301 located at the surface side of the original 302 comprises a concave cylindrical surface, and a fluorescent material 305 is applied to the inner surface (inner wall) 301c of the tube surface 301a. Also, in the sub scanning section, the fluorescent lamp is such that tube surface 301b opposed to the tube surface 301a is made flat.

In Embodiment 7, in the sub scanning section (FIG. 16), an angle θ1 defined by spreading from a point P on the surface of the original 302 to the effective diameter D of that tube surface 301a of the fluorescent lamp 301 located the surface side of the original 302 is set so as to be substantially equal to an angle θ2 defined by spreading from the point P to the diameter of the entrance pupil of an imaging lens 303 as imaging means which will be described later.

Reference numeral 302 denotes a transmission type original (transmission original) such as film on which image information to be read is formed. Reference numeral 303 designates imaging means comprising an imaging lens which images the image information of the original 302 on the surface of reading means 304 which will be described later. Reference numeral 304 denotes a line sensor (CCD) as reading means in which a plurality of picture elements (light receiving elements) are one-dimensionally arranged in the main scanning direction.

In Embodiment 7, the one-dimensional reading area 302a on the surface of the original 302 is intensively illuminated with a beam of light from the fluorescent lamp 301 constructed as described above, and the image information on the original 302 is imaged at a predetermined magnification on the surface of the line sensor 304 by the imaging lens 303. The relative position of the original 302 and the line sensor 304 is then changed and in Embodiment 7, the original 302 is moved (scanned) in the direction of arrow S (the sub scanning direction) to thereby sequentially read the two-dimensional image information on the surface of the original 302 by the line sensor 304.

The original illuminating method which is the feature of Embodiment 7 will now be described.

In Embodiment 7, as previously described, in the sub scanning section shown in FIG. 16, the spread angle θ1 defined by the point P on the surface of the original 302 and the effective diameter D of the tube surface (diffusing surface) 301a of the fluorescent lamp 301 is set so as to be substantially equal to the angle θ2 defined by the point P and the diameter of the entrance pupil of the imaging lens 303. Thereby, a beam of light c which is a light beam component of the highest intensity emitted perpendicularly from the tube surface (diffusing surface) 301a of the fluorescent lamp 301 located at the surface side of the original 302 is emitted toward within the range of the angular aperture at the object side of the imaging lens 303 to thereby intensively illuminate the one-dimensional reading area 302a on the surface of the original 302. Most of the beam of light passed through the imaging lens 303 is made to enter the surface of the line sensor 304 to thereby read the image information on the original 302 at a high speed.

As described above, in Embodiment 7, in the sub scanning section, the shape of that tube surface 301a of the fluorescent lamp 301 located at the surface side of the original 302 is made into a concave surface and the fluorescent material 305 is applied to the inner side (inner wall) 301c of the tube surface 301a comprising the concave surface, whereby each ray of illuminating light is caused to be directed within the NA at the object side of the imaging lens 303 so that the one-dimensional (linear) reading area 302a on the surface of the original 302 can be intensively illuminated. Thus, in Embodiment 7, the quantity of light (the quantity of incident light) arriving at the line sensor 304 can be increased to thereby achieve a higher reading speed and also, the F number of the imaging lens 303 can be made dark and a lower cost such as a reduction in the number of lenses can also be achieved.

Figure 17:
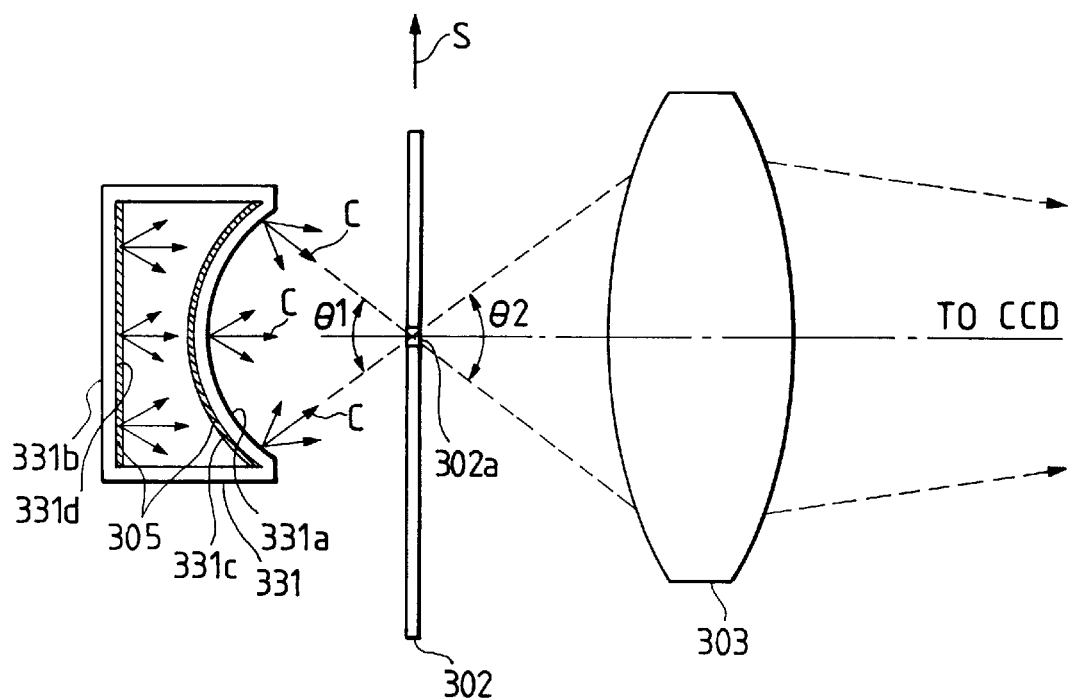
FIG. 17 is a sub scanning sectional view of Embodiment 8 of the image reading apparatus of the present invention.

FIG. 17 is a schematic view (a sub scanning sectional view) of the essential portions of Embodiment 8 of the present invention in the sub scanning direction. In FIG. 17, the same elements as the elements shown in FIG. 16 are given the same reference numerals.

The difference of Embodiment 8 from the aforedescribed Embodiment 7 is that in a fluorescent lamp 331 a fluorescent material 305 is also applied to the inner surface (inner wall) 331d of the tube surface 331b opposite to the tube surface 331a located at the surface side of the original 302. In the other points, the construction and optical action of Embodiment 8 are substantially similar to those of the aforedescribed Embodiment 7, whereby a similar effect is obtained.

Reference numeral 331 designates a fluorescent lamp (a hot cathode tube or a cold cathode tube) as light source means, and the cross-sectional shape of that tube surface 331a which is located at the surface side of the original 302 and which emits a beam of light is formed by a flat surface with respect to the main scanning direction of a one-dimensional reading area on the surface of the original 302 and is formed by a concave surface with respect to the sub scanning direction of the reading area. Also, in the fluorescent lamp 331, a fluorescent material 305 is applied to the inner surface 331c of the tube surface 331a formed by this concave surface and is also applied to the inner surface 331d of the tube surface 331b opposite to the tube surface 331a.

In Embodiment 8, the one-dimensional reading area 302a on the surface of the original 302 is intensively illuminated with a beam of light from the fluorescent lamp 331 constructed as described above, and image information on the original 302 is imaged at a predetermined magnification on the surface of a line sensor (not shown) by the imaging lens 303. The relative position of the original 302 and the line sensor is then changed, and in Embodiment 8, the original 302 is moved (scanned) in the direction of arrow S (the sub scanning direction) to thereby sequentially read the two-dimensional image information on the surface of the original 302 by the line sensor.

Thus, in Embodiment 8, as in the aforedescribed Embodiment 7, as shown in FIG. 17, a beam of light c which is a light beam component of the highest intensity perpendicularly emitted from that tube surface (diffusing surface) 331a of the fluorescent lamp 331 located at the surface side of the original 302 is emitted toward within the range of the angular aperture at the object side of the imaging lens 303 and therefore, most of the beam of light passed through the imaging lens 303 can be made to enter the surface of the line sensor.

Further, in Embodiment 8, the fluorescent material 305 is also applied to the inner surface 331d of that tube surface 331b in the fluorescent lamp 331 opposite to the tube surface 331a, whereby a light quantity component from the inner surface (light emitting surface) 331d can also be obtained and thus, the quantity of light as a whole can be further increased.

Figure 18:
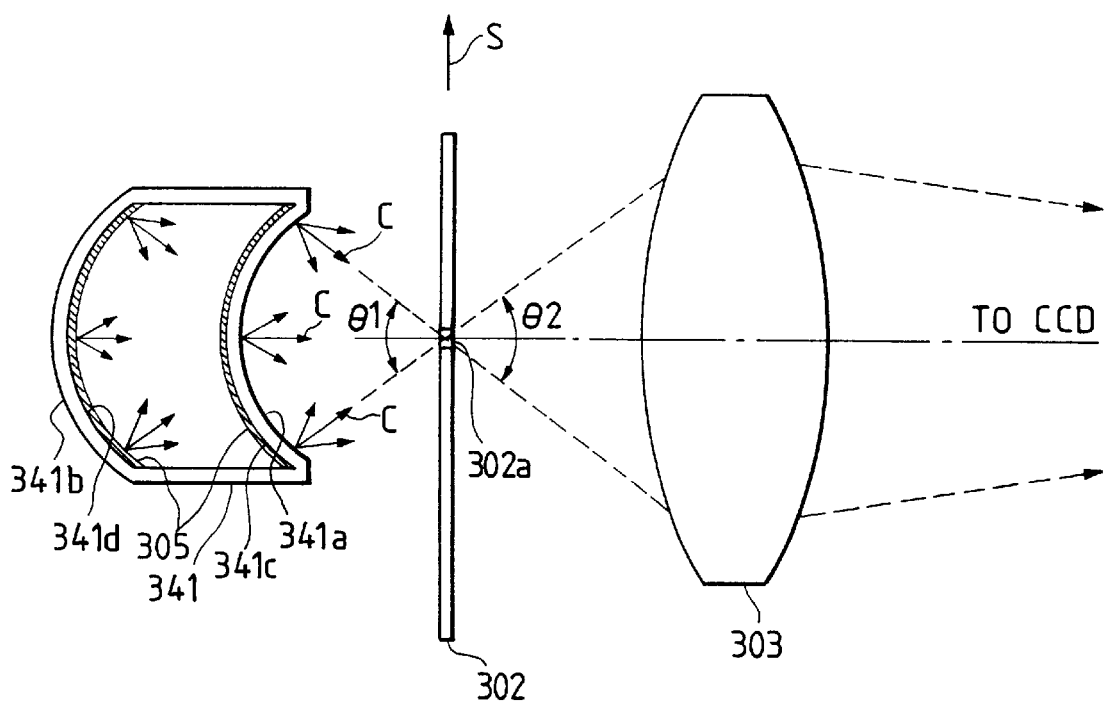
FIG. 18 is a sub scanning sectional view of Embodiment 9 of the image reading apparatus of the present invention.

FIG. 18 is a cross-sectional view (a sub scanning sectional view) of the essential portions of Embodiment 9 of the present invention in the sub scanning direction. In FIG. 18, the same elements as the elements shown in FIG. 15 are given the same reference numerals.

The difference of Embodiment 9 from the aforedescribed Embodiment 7 is that the shape of that tube surface 341b in a fluorescent lamp 341 opposite to the tube surface 341a located at the surface side of the original 302 is formed, in the sub scanning section, by a concave surface (a concave cylindrical surface) having the same polarity as that of the tube surface 341a and further, a fluorescent material 305 is also applied to the inner surface (inner wall) 341d of this tube surface 341b. In the other points, the construction and optical action of Embodiment 9 are substantially similar to those of the aforedescribed Embodiment 7, whereby a similar effect is obtained.

Reference numeral 341 denotes a fluorescent lamp (a hot cathode tube or a cold cathode tube) as light source means, and the cross-sectional shape of that tube surface 341a which is located at adjacent the surface side of an original 302 and which emits a beam of light is formed by a flat surface with respect to the main scanning direction of a one-dimensional reading area on the surface of the original 302 and is formed by a concave surface with respect to the sub scanning direction of the reading area. Also, the cross-sectional shape of that tube surface 341b in the fluorescent lamp 341 opposite to the tube surface 341a formed by the concave surface is formed, in the sub scanning section, by a concave surface (a concave cylindrical surface) having the same polarity as that of the tube surface 341a, and the fluorescent material 305 is also applied to the inner surface 341d of this tube surface 341b.

In Embodiment 9, the one-dimensional reading area 302a on the surface of the original 302 is intensively illuminated with a beam of light from the fluorescent lamp 341 constructed as described above and image information on the original 302 is imaged at a predetermined magnification on the surface of a line sensor (not shown) by the imaging lens 303. The relative position of the original 302 and the line sensor is then changed, and in Embodiment 9, the original 302 is moved (scanned) in the direction of arrow S (the sub scanning direction) to thereby sequentially read the two-dimensional image information on the surface of the original 302 by the line sensor.

Thus, in Embodiment 9, as in the aforedescribed Embodiment 7, as shown in FIG. 18, a beam of light c which is a light beam component of the highest intensity perpendicularly emitted from that tube surface (diffusing surface) 341a of the fluorescent lamp 341 located at the surface side of the original 302 is emitted toward within the range of the angular aperture at the object side of the imaging lens 303 and therefore, most of the beam of light passed through the imaging lens 303 can be made to enter the surface of the line sensor 304.

Further, in Embodiment 9, the cross-sectional shape of that tube surface 341b in the fluorescent lamp 341 opposite to the tube surface 341a is formed, in the sub scanning section, by a concave surface having the same polarity as that of the tube surface 341a and the fluorescent material 305 is also applied to the inner surface 341d of the tube surface 341b, whereby a light quantity component from this inner surface (light emitting surface) 341d is also obtained, and this, like the light emitting surface 341c located at the surface side of the original 302, is effective to direct the beam of light toward within the range of the angular aperture at the object side of the imaging lens 303 and therefore, the quantity of light as a whole can be further increased.

Figure 19:
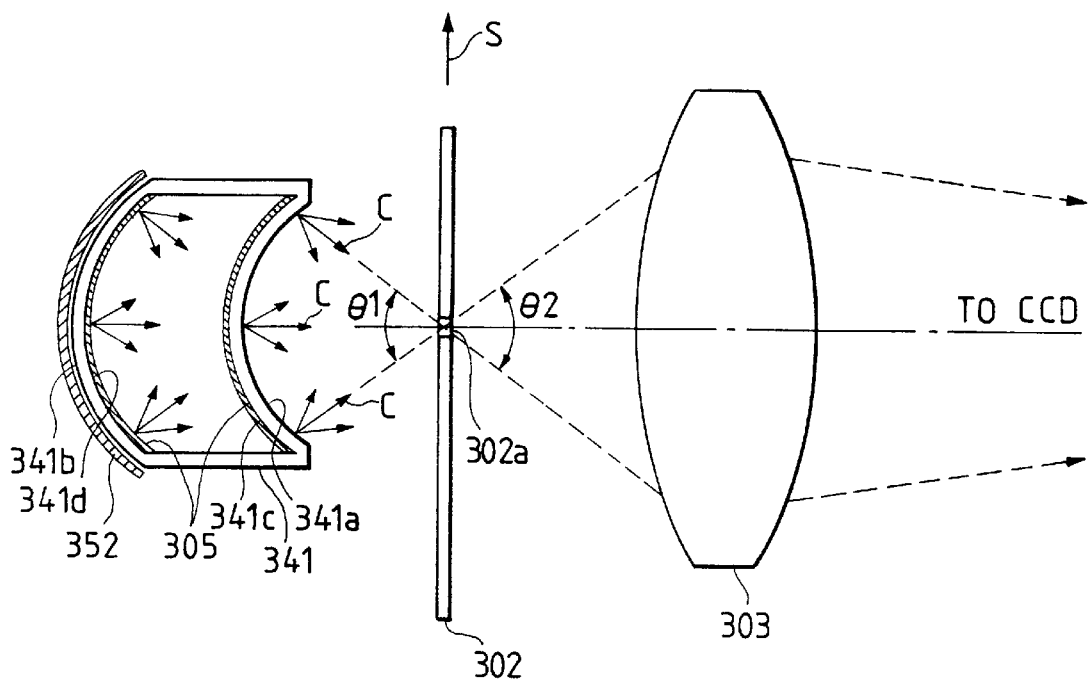
FIG. 19 is a sub scanning sectional view of Embodiment 10 of the image reading apparatus of the present invention.

FIG. 19 is a cross-sectional view (a sub scanning sectional view) of the essential portions of Embodiment 10 of the present invention. In FIG. 19, the same elements as the elements shown in FIG. 18 are given the same reference numerals.

The difference of Embodiment 10 from the aforedescribed Embodiment 9 is that metallic reflecting film 352 as reflecting means for reflecting a beam of light is provided on the outer surface (at the opposite side to the surface of the original 302) of that tube surface 341b in the fluorescent lamp 341 which faces the tube surface 341a located at the surface side of the original 302 for emitting a beam of light. In the other points, the construction and optical action of Embodiment 10 are substantially similar to those of the aforedescribed Embodiment 9, whereby a similar effect is obtained.

Reference numeral 352 denotes metallic reflecting film as reflecting means formed, for example, of aluminum or the like and provided on the outer surface of the tube surface 341b of the fluorescent lamp 341. In Embodiment 10, metallic reflecting film is provided as reflecting means, but alternatively, a dielectric material may be provided instead of the metallic reflecting film.

In Embodiment 10, the one-dimensional reading area 302a on the surface of the original 302 is intensively illuminated with a beam of light from the fluorescent lamp 341 constructed as described above, and the image information on the original 302 is imaged at a predetermined magnification on the surface of a line sensor (not shown) by the imaging lens 303. The reflective position of the original 302 and the line sensor is then changed, and in Embodiment 10, the original 302 is moved (scanned) in the direction of arrow S (the sub scanning direction) to thereby sequentially read the two-dimensional image information on the surface of the original 302 by the line sensor.

Thus, in Embodiment 10, as in the aforedescribed Embodiment 9, as shown in FIG. 19, a beam of light c which is a light beam component of the highest intensity perpendicularly emitted from that tube surface (diffusing surface) 341a of the fluorescent lamp 341 located at the surface side of the original 302 is emitted toward within the range of the angular aperture at the object side of the imaging lens 303 and therefore, most of the beam of light passed through the imaging lens 303 can be made to enter the surface of the line sensor and a light quantity component from the light emitting surface 341d which faces the light emitting surface 341c located at the surface side of the original 302 can also be obtained.

Further, in Embodiment 10, of the beam of light emitted from the light emitting surface 341d, the beam of light which is emitted in the direction opposite to the surface of the original 302 and which will be wasted is reflected toward the surface of the original 302 by the metallic reflecting film 352, whereby the quantity of light as a whole can be further increased.

Figure 20:
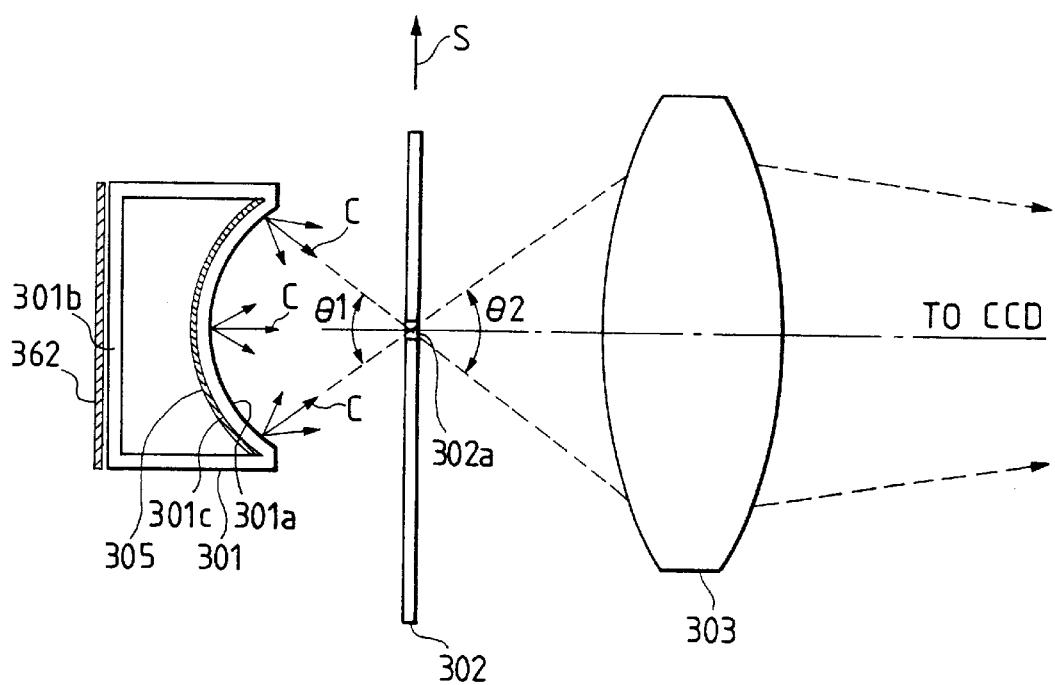
FIG. 20 is a sub scanning sectional view of Embodiment 11 of the image reading apparatus of the present invention.

FIG. 20 is a cross-sectional view (a sub scanning sectional view) of the essential portions of Embodiment 11 of the present invention in the sub scanning direction. In FIG. 20, the same elements as the elements shown in FIG. 15 are given the same reference numerals.

The difference of Embodiment 11 from the aforedescribed Embodiment 7 is that metallic reflecting film 362 as reflecting means for reflecting a beam of light is provided on the outer (opposite to the surface of the original 302) surface of that tube surface 301b in a fluorescent lamp 301 which faces a tube surface 301a located at the surface side of the original 302. In the other points, the construction and optical action of Embodiment 11 are substantially similar to those of the aforedescribed Embodiment 7, whereby a similar effect is obtained.

Reference numeral 362 designates metallic reflecting film as reflecting means formed of aluminum or the like and provided on the outer surface of the tube surface 301b of the fluorescent lamp 301. In Embodiment 11, metallic reflecting film is provided as the reflecting means, but alternatively, a dielectric material may be provided instead of the metallic reflecting film.

In Embodiment 11, the one-dimensional reading area 302a on the surface of the original 302 is intensively illuminated with a beam of light from the fluorescent lamp 301 constructed as described above and the image information on the original 302 is imaged at a predetermined magnification on the surface of a line sensor (not shown) by the imaging lens 303. The relative position of the original 302 and the line sensor is changed, and in Embodiment 11, the original 302 is moved (scanned) in the direction of arrow S (the sub scanning direction) to thereby sequentially read the two-dimensional image information on the surface of the original 302.

Thus, in Embodiment 11, as in the aforedescribed Embodiment 7, as shown in FIG. 20, a beam of light c which is a light beam component of the highest intensity perpendicularly emitted from that tube surface (diffusing surface) 301a of the fluorescent lamp 301 located at the surface side of the original 302 is emitted toward within the range of the angular aperture at the object side of the imaging lens 303 and therefore, most of the beam of light passed through the imaging lens 303 can be made to enter the surface of the line sensor 304.

Further, in Embodiment 11, the beam of light which is emitted from the tube surface 301b and which will be wasted is reflected toward the surface of the original 302 by the metallic reflecting film 362, whereby the quantity of light as a whole can be further increased.

Of course, the metallic reflecting film may be provided on the outer surface of the tube surface 331b of the fluorescent lamp 331 in Embodiment 8 shown in FIG. 17.

Figure 21:
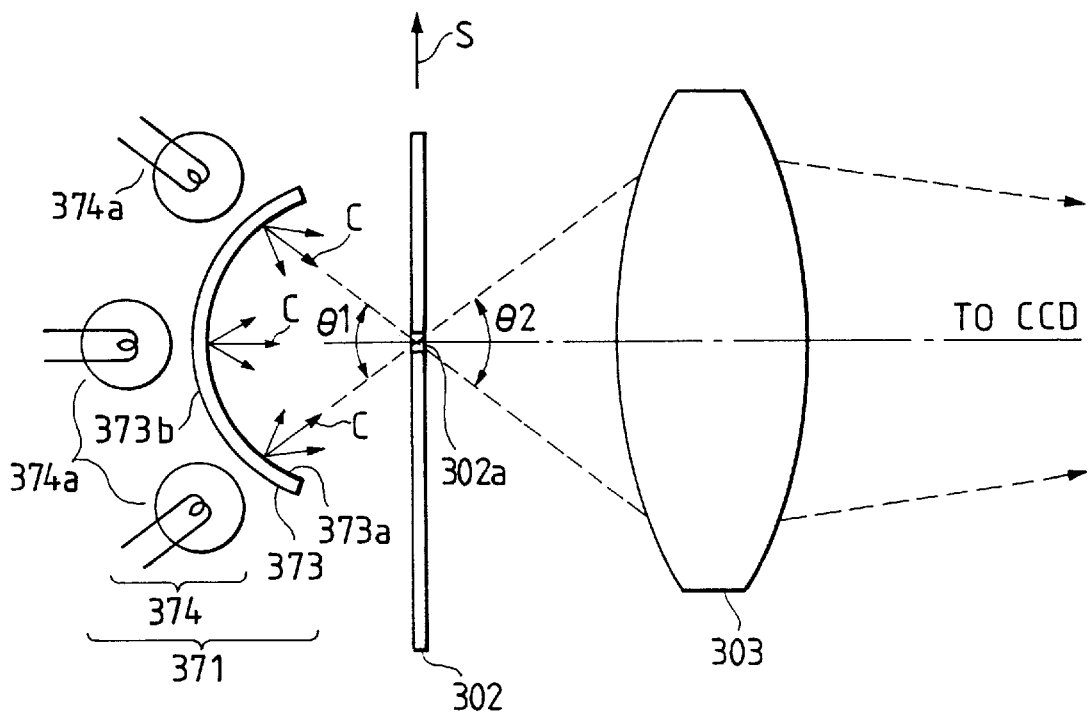
FIG. 21 is a sub scanning sectional view of Embodiment 12 of the image reading apparatus of the present invention.

FIG. 21 is a cross-sectional view (a sub scanning sectional view) of the essential portions of Embodiment 12 of the present invention in the sub scanning direction. In FIG. 21, the same elements as the elements shown in FIG. 15 are given the same reference numerals.

The difference of Embodiment 12 from the aforedescribed Embodiment 7 is that light source means 371 is comprised of a combination of a diffusing plate 373 for diffusing a beam of light and a light source unit 374 having a plurality of incandescent lamps (incandescent light sources) 374a. In the other points, the construction and optical action of Embodiment 12 are substantially similar to those of the aforedescribed Embodiment 7, whereby a similar effect is obtained.

In FIG. 21, reference numeral 371 denotes light source means comprising a diffusing plate 373 formed so as to cover the range of the one-dimensional reading area on the surface of the original 302 in the main scanning direction, and a light source unit 374 comprising a plurality of incandescent lamps 374a arranged respectively in the main scanning direction and in the sub scanning direction. The diffusing plate 373 is such that the cross-sectional shape of the diffusing surface 373a thereof facing the surface of the original 302 comprises a flat surface with respect to the main scanning direction of the one-dimensional reading area on the surface of the original 302 and comprises a concave surface (a concave cylindrical surface) with respect to the sub scanning direction of the reading area. The incandescent lamps 374a are juxtaposed along the outer (opposite to the surface of the original 302) surface 373b of the diffusing plate 373 in a plurality of rows in the main scanning direction and for example, in three rows in the sub scanning direction. The number of rows of the incandescent lamps in the sub scanning direction is not limited to the three.

In Embodiment 12, the one-dimensional reading area 302a on the surface of the original 302 is intensively illuminated with beams of light from the light source means 371 constructed as described above and the image information on the original 302 is imaged at a predetermined magnification on the surface of a line sensor (not shown) by the imaging lens 303. The relative position of the original 302 and the line sensor is then changed, and in Embodiment 12, the original 302 is moved (scanned) in the direction of arrow S (the sub scanning direction) to thereby sequentially read the two-dimensional image information on the surface of the original 302.

Thus, in Embodiment 12, as shown in FIG. 21, of the diffused beams of light diffused by the diffusing plate 373, a beam of light c which is a light beam component of the highest intensity perpendicularly emitted from the diffusing surface 373a is emitted toward within the range of the angular aperture at the object side of the imaging lens and therefore, as in each of the aforedescribed embodiment, most of the beam of light passed through the imaging lens 303 can be made to enter the surface of the line sensor.

Figure 22:
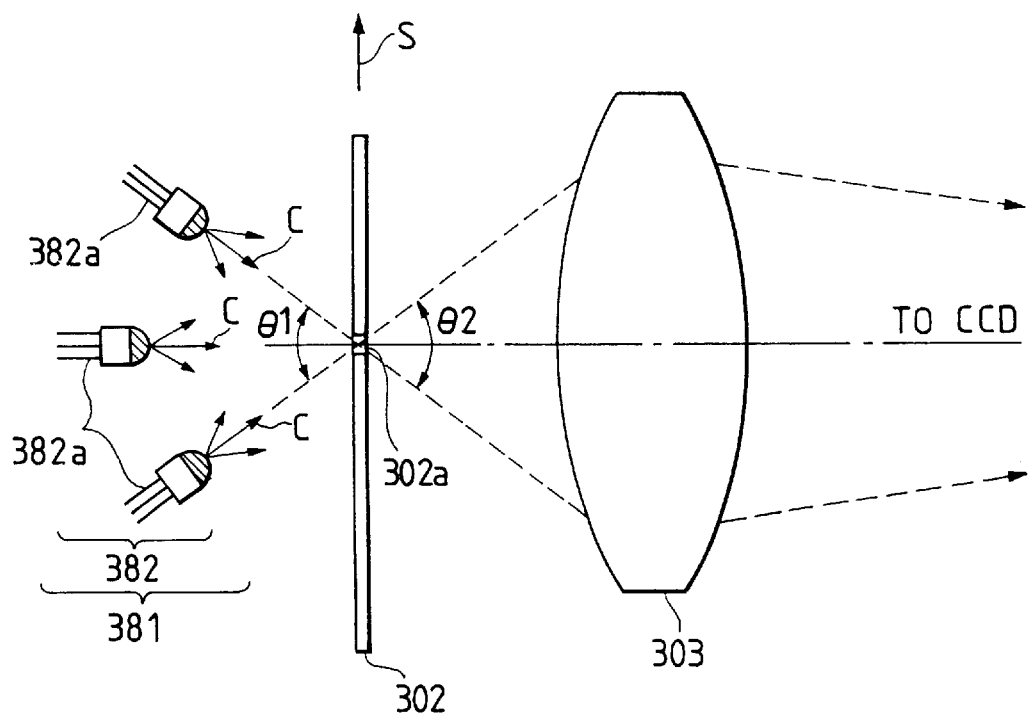
FIG. 22 is a sub scanning sectional view of Embodiment 13 of the image reading apparatus of the present invention.

FIG. 22 is a cross-sectional view (a sub scanning sectional view) of the essential portions of Embodiment 13 of the present invention. In FIG. 22, the same elements as the elements shown in FIG. 15 are given the same reference numerals.

The difference of Embodiment 13 from the aforedescribed Embodiment 7 is that light source means 381 is comprised of a light source unit 382 having a plurality of light emitting diodes (LEDs) 382a. In the other points, the construction and optical action of Embodiment 13 are substantially similar to those of the aforedescribed Embodiment 7, whereby a similar effect is obtained.

Reference numeral 381 designates light source means comprising a light source unit (LED light source) 382 having light emitting diodes (LEDs) 382a juxtaposed in a plurality of rows in the main scanning direction and for example, in three rows in the sub scanning direction so as to cover the range of the one-dimensional reading area on the surface of the original 302 in the main scanning direction. In Embodiment 13, the plurality of light emitting diodes 382a constituting the light source unit 382 are arranged so as to be in one plane with respect to the main scanning direction of the one-dimensional reading area on the surface of the original 302 and is designed so as to be in concave configuration with respect to the sub scanning direction of the reading area. The number of rows of the light emitting diodes in the sub scanning direction is not limited to three.

In Embodiment 13, the one-dimensional reading area 302a on the surface of the original 302 is intensively illuminated with beams of light from the light source means 381 and the image information on the original 302 is imaged at a predetermined magnification on the surface of a line sensor (not shown) by the imaging lens 303. The relative position of the original 302 and the line sensor is then changed, and in Embodiment 13, the original 302 is moved (scanned) in the direction of arrow S (the sub scanning direction) to thereby sequentially read the two-dimensional image information on the surface of the original 302 by the line sensor.

Thus, in Embodiment 13, as shown in FIG. 22, of the diffused beams of light emitted from the light emitting diodes (LEDs) 382a, a beam of light c which is a light beam component of the highest intensity in the central portion of the light source is directed toward within the range of the angular aperture at the object side of the imaging lens 303 and therefore, as in each of the aforedescribed embodiments, most of the beam of light passed through the imaging lens 303 can be made to enter the surface of the line sensor 304.

In the above-described embodiments, a fluorescent lamp, a combination of a diffusing plate and an incandescent lamp, or light emitting diodes are used as the light source means, but if the light source means is designed to satisfy the aforedescribed conditions, other light sources than those described above can be applied to the present invention as in the aforedescribed embodiments.

As described above, the image reading apparatus of the present invention is characterized in that when the image information on the original illuminated with the beam of light from the light source means is to be imaged, by the imaging means, on the surface of the reading means in which a plurality of picture elements are one-dimensionally arranged in the main scanning direction and the original and the reading means are to be moved relative to each other in the sub scanning direction substantially orthogonal to the main scanning direction to thereby read the image information, the light source means is such that the cross-sectional shape of that surface thereof emitting the beam of light, located at the surface side of the original comprises a flat surface relative to the main scanning direction and comprises a concave surface with respect to the sub scanning direction.

According to the present invention, as previously described, there can be achieved an image reading apparatus in which the shape of the light beam emitting surface (tube surface) of light source means for illuminating an original and each element constituting the light source means are appropriately set, whereby a beam of light capable of entering the effective diameter of imaging means from the object side thereof via the original can be increased and thereby, the quantity of light arriving at reading means (line sensor) is increased, whereby the reading speed can be made higher and the F number of the imaging lens can be made dark and the number of lenses can be reduced.

What is claimed is:

1. An image reading apparatus comprising:

light source means for illuminating an original, said light source means including a cathode tube of which a tube surface thereof opposed to a surface of the original comprises a flat surface, wherein the cathode tube has a fluorescent flat surface;

reading means; and imaging means for causing image information of the original illuminated with a beam of light from said light source means to be imaged on said reading means.

2. An image reading apparatus according to claim 1, wherein the original is a transmission type original.

3. An image reading apparatus according to claim 1, wherein said reading means comprises a line sensor in which a plurality of picture elements are one-dimensionally arranged in a main scanning direction.

4. An image reading apparatus according to claim 1, wherein said reading means comprises a three-line sensor in which three line sensors, each of which includes a plurality of picture elements one-dimensionally arranged in a main scanning direction, are juxtaposed in a sub scanning direction.

5. An image reading apparatus according to claim 1, wherein said reading means comprises an area sensor in which a plurality of picture elements are two-dimensionally arranged in a main scanning direction and in a sub scanning direction.

6. An image reading apparatus comprising:

light source means for illuminating an original, said light source means including a tube surface of which a cross-sectional shape thereof facing a surface of the original comprises a flat surface with respect to a main scanning direction and a concave surface with respect to a sub scanning direction;

reading means; and imaging means for causing image information of the original illuminated with a beam of light from said light source means to be imaged on said reading means.

7. An image reading apparatus according to claim 6, wherein said light source means includes a fluorescent lamp, and an inner surface of the tube surface thereof facing the surface of the original has a fluorescent material applied thereto.

8. An image reading apparatus according to claim 7, wherein the fluorescent material is applied to a surface inside the fluorescent lamp opposed to the inner surface.

* * * * *